(12) United States Patent
Giuliano

(10) Patent No.: US 12,176,815 B2
(45) Date of Patent: *Dec. 24, 2024

(54) SWITCHED-CAPACITOR CIRCUIT CONTROL IN POWER CONVERTERS

(71) Applicant: pSemi Corporation, San Diego, CA (US)

(72) Inventor: David Giuliano, Bedford, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/743,046

(22) Filed: Jun. 13, 2024

(65) Prior Publication Data

US 2024/0339932 A1 Oct. 10, 2024

Related U.S. Application Data

(63) Continuation of application No. 18/606,319, filed on Mar. 15, 2024, which is a continuation of application
(Continued)

(51) Int. Cl.
*H02M 3/07* (2006.01)
*H02M 1/00* (2007.01)
*H02M 3/158* (2006.01)

(52) U.S. Cl.
CPC ....... *H02M 3/1584* (2013.01); *H02M 1/0043* (2021.05); *H02M 3/07* (2013.01);
(Continued)

(58) Field of Classification Search
CPC .............. H02M 1/0043; H02M 1/007; H02M 3/07–3/078; H02M 3/1584; H02M 3/1586
See application file for complete search history.

(56) References Cited

U.S. PATENT DOCUMENTS 3,370,215 A 2/1968 Light, Jr.
3,745,437 A 7/1973 Brown
(Continued)

FOREIGN PATENT DOCUMENTS

CN 1132959 10/1996
CN 1483204 3/2004
(Continued)

OTHER PUBLICATIONS

Jiang, Jun et al., "Development and Production of ZCS Soft Switching Converter-based Gate Driver IC," 2009 IEEE 8th International Conference on ASIC, Changsha, China, 2009, pp. 1058-1061.
(Continued)

*Primary Examiner* — Fred E Finch, III
(74) *Attorney, Agent, or Firm* — Haynes and Boone, LLP

(57) ABSTRACT

An apparatus for power conversion comprises a voltage transformation element, a regulating element, and a controller; wherein, a period of the voltage transformation element is equal to a product of a coefficient and a period of the regulating circuit, and wherein the coefficient is selected from a group consisting of a positive integer and a reciprocal of said integer.

30 Claims, 14 Drawing Sheets

Related U.S. Application Data

No. 17/491,983, filed on Oct. 1, 2021, now Pat. No. 11,936,300, which is a continuation of application No. 16/872,207, filed on May 11, 2020, now Pat. No. 11,165,350, which is a continuation of application No. 14/857,141, filed on Sep. 17, 2015, now Pat. No. 10,686,380, which is a continuation of application No. 14/309,003, filed on Jun. 19, 2014, now Pat. No. 9,143,037, which is a continuation of application No. PCT/US2012/070555, filed on Dec. 19, 2012.

(60) Provisional application No. 61/577,271, filed on Dec. 19, 2011.

(52) U.S. Cl.
CPC .......... *H02M 1/0058* (2021.05); *H02M 1/007* (2021.05); *H02M 3/1586* (2021.05)

(56) References Cited

U.S. PATENT DOCUMENTS

| | | |
|---|---|---|
| 3,818,306 A | 6/1974 | Marini |
| 3,818,360 A | 6/1974 | Boutmy |
| 4,214,174 A | 7/1980 | Dickson |
| 4,408,268 A | 10/1983 | Peters |
| 4,415,959 A | 11/1983 | Vinciarelli |
| 4,513,364 A | 4/1985 | Nilssen |
| 4,812,961 A | 3/1989 | Essaff |
| 4,903,181 A | 2/1990 | Seidel |
| 5,006,782 A | 4/1991 | Pelly |
| 5,057,986 A | 10/1991 | Henze |
| 5,119,283 A | 6/1992 | Steigerwald |
| 5,132,606 A | 7/1992 | Herbert |
| 5,159,539 A | 10/1992 | Koyama |
| 5,198,970 A | 3/1993 | Kawabata |
| 5,268,832 A | 12/1993 | Kandatsu |
| 5,301,097 A | 4/1994 | McDaniel |
| 5,331,303 A | 7/1994 | Shiota |
| 5,345,376 A | 9/1994 | Nourbakhsh |
| 5,402,329 A | 3/1995 | Wittenbreder, Jr. |
| 5,504,418 A | 4/1996 | Ashley |
| 5,548,206 A | 8/1996 | Soo |
| 5,557,193 A | 9/1996 | Kajimoto |
| 5,661,348 A | 8/1997 | Brown |
| 5,717,581 A | 2/1998 | Canclini |
| 5,737,201 A | 4/1998 | Meynard |
| 5,761,058 A | 6/1998 | Kanda |
| 5,793,626 A | 8/1998 | Jiang |
| 5,801,987 A | 9/1998 | Dinh |
| 5,812,017 A | 9/1998 | Golla |
| 5,831,846 A | 11/1998 | Jiang |
| 5,892,395 A | 4/1999 | Stengel |
| 5,907,484 A | 5/1999 | Kowshik |
| 5,956,243 A | 9/1999 | Mao |
| 5,959,565 A | 9/1999 | Taniuchi |
| 5,959,585 A | 9/1999 | Militz |
| 5,978,283 A | 11/1999 | Hsu |
| 5,982,645 A | 11/1999 | Levran |
| 6,107,864 A | 8/2000 | Fukushima |
| 6,133,788 A | 10/2000 | Dent |
| 6,140,807 A | 10/2000 | Vannatta |
| 6,154,380 A | 11/2000 | Assow |
| 6,157,253 A | 12/2000 | Sigmon |
| 6,178,102 B1 | 1/2001 | Stanley |
| 6,198,645 B1 | 3/2001 | Kotowski |
| 6,255,906 B1 | 7/2001 | Eidson |
| 6,275,018 B1 | 8/2001 | Telefus |
| 6,316,956 B1 | 11/2001 | Oglesbee |
| 6,327,462 B1 | 12/2001 | Loke |
| 6,339,538 B1 | 1/2002 | Handleman |
| 6,362,608 B1 | 3/2002 | Ashburn et al. |
| 6,377,117 B2 | 4/2002 | Oskowsky |
| 6,396,341 B1 | 5/2002 | Pehlke |
| 6,400,579 B2 | 6/2002 | Cuk |
| 6,411,531 B1 | 6/2002 | Nork et al. |
| 6,429,632 B1 | 8/2002 | Forbes |
| 6,476,666 B1 | 11/2002 | Palusa |
| 6,486,728 B2 | 11/2002 | Kleveland |
| 6,501,325 B1 | 12/2002 | Meng |
| 6,504,422 B1 | 1/2003 | Rader |
| 6,507,503 B2 | 1/2003 | Norrga |
| 6,512,411 B2 | 1/2003 | Meng et al. |
| 6,515,612 B1 | 2/2003 | Abel |
| 6,563,235 B1 | 5/2003 | McIntyre |
| 6,650,552 B2 | 11/2003 | Takagi |
| 6,657,875 B1 | 12/2003 | Zeng et al. |
| 6,657,876 B2 | 12/2003 | Satoh |
| 6,700,803 B2 | 3/2004 | Krein |
| 6,738,277 B2 | 5/2004 | Odell |
| 6,738,432 B2 | 5/2004 | Pehlke |
| 6,759,766 B2 | 7/2004 | Hiratsuka |
| 6,791,298 B2 | 9/2004 | Shenai |
| 6,798,177 B1 | 9/2004 | Liu |
| 6,927,441 B2 | 8/2005 | Pappalardo |
| 6,934,167 B2 | 8/2005 | Jang |
| 6,980,181 B2 | 12/2005 | Sudo |
| 6,995,995 B2 | 2/2006 | Zeng |
| 7,071,660 B2 | 7/2006 | Xu |
| 7,072,195 B2 | 7/2006 | Xu |
| 7,091,778 B2 | 8/2006 | Gan |
| 7,103,114 B1 | 9/2006 | Lapierre |
| 7,135,847 B2 | 11/2006 | Taurand |
| 7,145,382 B2 | 12/2006 | Ker |
| 7,157,956 B2 | 1/2007 | Wei |
| 7,161,816 B2 | 1/2007 | Shteynberg |
| 7,187,159 B2 | 3/2007 | Katoh |
| 7,190,210 B2 | 3/2007 | Azrai |
| 7,224,062 B2 | 5/2007 | Hsu |
| 7,236,542 B2 | 6/2007 | Matero |
| 7,239,194 B2 | 7/2007 | Azrai |
| 7,250,810 B1 | 7/2007 | Tsen |
| 7,259,974 B2 | 8/2007 | Donaldson |
| 7,269,036 B2 | 9/2007 | Deng |
| 7,307,338 B1 | 12/2007 | Mandell |
| 7,330,070 B2 | 2/2008 | Väisänen |
| 7,362,251 B2 | 4/2008 | Jensen |
| 7,375,992 B2 | 5/2008 | Mok |
| 7,382,113 B2 | 6/2008 | Wai |
| 7,382,634 B2 | 6/2008 | Buchmann |
| 7,408,330 B1 | 8/2008 | Zhao |
| 7,443,705 B2 | 10/2008 | Ito |
| 7,511,978 B2 | 3/2009 | Chen |
| 7,521,914 B2 | 4/2009 | Dickerson |
| 7,535,133 B2 | 5/2009 | Perreault |
| 7,589,605 B2 | 9/2009 | Perreault |
| 7,595,682 B2 | 9/2009 | Lin |
| 7,612,603 B1 | 11/2009 | Petricek et al. |
| 7,616,467 B2 | 11/2009 | Mallwitz |
| 7,633,778 B2 | 12/2009 | Mok |
| 7,696,735 B2 | 4/2010 | Oraw |
| 7,705,681 B2 | 4/2010 | Ilkov |
| 7,724,551 B2 | 5/2010 | Yanagida |
| 7,728,651 B2 | 6/2010 | Nakai |
| 7,746,041 B2 | 6/2010 | Xu et al. |
| 7,768,800 B2 | 8/2010 | Mazumder |
| 7,777,459 B2 | 8/2010 | Williams |
| 7,782,027 B2 | 8/2010 | Williams |
| 7,786,712 B2 | 8/2010 | Williams |
| 7,807,499 B2 | 10/2010 | Nishizawa |
| 7,812,579 B2 | 10/2010 | Williams |
| 7,889,519 B2 | 2/2011 | Perreault |
| 7,907,429 B2 | 3/2011 | Ramadass |
| 7,907,430 B2 | 3/2011 | Kularatna |
| 7,928,705 B2 | 4/2011 | Hooijschuur |
| 7,940,038 B2 | 5/2011 | Da Silva |
| 7,952,418 B2 | 5/2011 | McDonald |
| 7,956,572 B2 | 6/2011 | Zane |
| 7,977,921 B2 | 7/2011 | Bahai |
| 7,999,601 B2 | 8/2011 | Schlueter |
| 8,000,117 B2 | 8/2011 | Petricek |
| 8,018,216 B2 | 9/2011 | Kakehi |
| 8,026,763 B2 | 9/2011 | Dawson |
| 8,031,003 B2 | 10/2011 | Dishop |

(56) References Cited

U.S. PATENT DOCUMENTS

| | | |
|---|---|---|
| 8,040,174 B2 | 10/2011 | Likhterov |
| 8,048,766 B2 | 11/2011 | Joly |
| 8,076,915 B2 | 12/2011 | Nakazawa |
| 8,085,524 B2 | 12/2011 | Roozeboom |
| 8,089,788 B2 | 1/2012 | Jain |
| 8,106,597 B2 | 1/2012 | Mednik |
| 8,111,052 B2 | 2/2012 | Glovinsky |
| 8,111,054 B2 | 2/2012 | Yen |
| 8,130,518 B2 | 3/2012 | Fishman |
| 8,159,091 B2 | 4/2012 | Yeates |
| 8,164,384 B2 | 4/2012 | Dawson |
| 8,169,797 B2 | 5/2012 | Coccia |
| 8,193,604 B2 | 6/2012 | Lin |
| 8,212,541 B2 | 7/2012 | Perreault |
| 8,276,002 B2 | 9/2012 | Dennard |
| 8,330,436 B2 | 12/2012 | Oraw |
| 8,339,184 B2 | 12/2012 | Kok |
| 8,350,549 B2 | 1/2013 | Kitabatake |
| 8,354,828 B2 | 1/2013 | Huang |
| 8,384,467 B1 | 2/2013 | O'Keeffe |
| 8,395,914 B2 | 3/2013 | Klootwijk |
| 8,423,800 B2 | 4/2013 | Huang |
| 8,451,053 B2 | 5/2013 | Perreault |
| 8,456,874 B2 | 6/2013 | Singer |
| 8,503,203 B1 | 8/2013 | Szczeszynski |
| 8,542,169 B2 | 9/2013 | Senda |
| 8,582,333 B2 | 11/2013 | Oraw |
| 8,629,666 B2 | 1/2014 | Carroll |
| 8,643,347 B2 | 2/2014 | Giuliano |
| 8,659,353 B2 | 2/2014 | Dawson |
| 8,670,254 B2 | 3/2014 | Perreault |
| 8,699,248 B2 | 4/2014 | Giuliano |
| 8,718,188 B2 | 5/2014 | Balteanu |
| 8,723,491 B2 | 5/2014 | Giuliano |
| 8,729,819 B2 | 5/2014 | Zhao |
| 8,737,093 B1 | 5/2014 | Baker |
| 8,743,553 B2 | 6/2014 | Giuliano |
| 8,760,219 B2 | 6/2014 | Chao |
| 8,803,492 B2 | 8/2014 | Liu |
| 8,824,978 B2 | 9/2014 | Briffa |
| 8,829,993 B2 | 9/2014 | Briffa |
| 8,830,709 B2 | 9/2014 | Perreault |
| 8,830,710 B2 | 9/2014 | Perreault |
| 8,854,019 B1 | 10/2014 | Levesque |
| 8,856,562 B2 | 10/2014 | Huang |
| 8,860,396 B2 | 10/2014 | Giuliano |
| 8,957,727 B2 | 2/2015 | Dawson |
| 9,048,727 B2 | 6/2015 | Giuliano |
| 9,143,037 B2 | 9/2015 | Giuliano |
| 9,209,758 B2 | 12/2015 | Briffa |
| 9,209,787 B2 | 12/2015 | Shelton |
| 9,350,234 B2 | 5/2016 | Verma |
| 9,362,826 B2 | 6/2016 | Giuliano |
| 9,413,257 B2 | 8/2016 | Wang |
| 9,450,506 B2 | 9/2016 | Perreault |
| 9,497,854 B2 | 11/2016 | Giuliano |
| 9,577,590 B2 | 2/2017 | Levesque |
| 9,584,024 B2 | 2/2017 | Manthe |
| 9,634,577 B2 | 4/2017 | Perreault |
| 9,640,445 B1 | 5/2017 | Hwang |
| 9,712,051 B2 | 7/2017 | Giuliano |
| 9,755,672 B2 | 9/2017 | Perreault |
| 9,825,545 B2 | 11/2017 | Chen |
| 9,853,637 B1 | 12/2017 | Meiser |
| 9,862,052 B2 | 1/2018 | Vogel |
| 9,865,729 B1 | 1/2018 | Pendharkar |
| 9,882,471 B2 | 1/2018 | Giuliano |
| 10,083,947 B2 | 9/2018 | Giuliano |
| 10,128,745 B2 | 11/2018 | Low |
| 10,326,358 B2 | 6/2019 | Giuliano |
| 10,340,794 B1 | 7/2019 | Zhang |
| 10,381,924 B2 | 8/2019 | Giuliano |
| 10,389,235 B2 | 8/2019 | Giuliano |
| 10,389,236 B1 | 8/2019 | Low |
| 10,404,162 B2 | 9/2019 | Giuliano |
| 10,424,564 B2 | 9/2019 | Giuliano |
| 10,476,395 B2 | 11/2019 | Dai |
| 10,483,352 B1 | 11/2019 | Mokhti |
| 10,541,611 B2 | 1/2020 | Giuliano |
| 10,549,373 B2 | 2/2020 | Madsen |
| 10,601,324 B1 | 3/2020 | Kudva |
| 10,680,515 B2 | 6/2020 | Giuliano |
| 10,686,367 B1 | 6/2020 | Low |
| 10,686,380 B2 | 6/2020 | Giuliano |
| 10,693,387 B2 | 6/2020 | Nakahata |
| 10,720,913 B1 | 7/2020 | Leong |
| 10,749,434 B2 | 8/2020 | Giuliano et al. |
| 10,756,624 B2 | 8/2020 | Mauri |
| 10,756,643 B2 | 8/2020 | Chen |
| 10,797,660 B2 | 10/2020 | Delano |
| 10,917,007 B2 | 2/2021 | Giuliano |
| 10,926,649 B2 | 2/2021 | Nagashima |
| 10,938,299 B2 | 3/2021 | Low et al. |
| 10,938,300 B2 | 3/2021 | Giuliano |
| 11,038,418 B2 | 6/2021 | Low et al. |
| 11,936,300 B2 * | 3/2024 | Giuliano .............. H02M 1/0043 |
| 2002/0008567 A1 * | 1/2002 | Henry .................. H02M 3/073 |
| | | 327/536 |
| 2002/0060914 A1 | 5/2002 | Porter |
| 2002/0130704 A1 | 9/2002 | Myono |
| 2002/0158660 A1 | 10/2002 | Jang |
| 2003/0169096 A1 | 9/2003 | Hsu |
| 2003/0227280 A1 | 12/2003 | Vinciarelli |
| 2004/0004851 A1 | 1/2004 | Itoh |
| 2004/0041620 A1 | 3/2004 | D'Angelo |
| 2004/0170030 A1 | 9/2004 | Duerbaum |
| 2004/0222775 A1 | 11/2004 | Muramatsu |
| 2005/0007184 A1 | 1/2005 | Kamijo |
| 2005/0024125 A1 | 2/2005 | Mcnitt |
| 2005/0047181 A1 | 3/2005 | Yumamoto et al. |
| 2005/0067711 A1 | 3/2005 | Opheim |
| 2005/0088865 A1 | 4/2005 | Lopez |
| 2005/0102798 A1 | 5/2005 | Kato |
| 2005/0207133 A1 | 9/2005 | Pavier |
| 2005/0213267 A1 | 9/2005 | Azrai |
| 2005/0213280 A1 | 9/2005 | Azrai |
| 2005/0219878 A1 | 10/2005 | Ito et al. |
| 2005/0254272 A1 | 11/2005 | Vinciarelli |
| 2005/0286278 A1 | 12/2005 | Perreault |
| 2006/0139021 A1 | 6/2006 | Taurand |
| 2006/0153495 A1 | 7/2006 | Wynne |
| 2006/0213890 A1 | 9/2006 | Kooken |
| 2006/0226130 A1 | 10/2006 | Kooken |
| 2006/0244513 A1 | 11/2006 | Yen et al. |
| 2007/0013448 A1 | 1/2007 | Azuhata et al. |
| 2007/0024346 A1 | 2/2007 | Takahashi et al. |
| 2007/0035977 A1 | 2/2007 | Odell |
| 2007/0051712 A1 | 3/2007 | Kooken |
| 2007/0066224 A1 | 3/2007 | d'Hont |
| 2007/0066250 A1 | 3/2007 | Takahashi |
| 2007/0069818 A1 | 3/2007 | Bhatti |
| 2007/0085187 A1 | 4/2007 | Sun |
| 2007/0091655 A1 | 4/2007 | Oyama |
| 2007/0123184 A1 | 5/2007 | Nesimoglu |
| 2007/0146020 A1 | 6/2007 | Williams |
| 2007/0146090 A1 | 6/2007 | Carey |
| 2007/0159257 A1 | 7/2007 | Lee |
| 2007/0161266 A1 | 7/2007 | Nishizawa |
| 2007/0171680 A1 | 7/2007 | Perreault |
| 2007/0182390 A1 | 8/2007 | Ishii et al. |
| 2007/0210774 A1 | 9/2007 | Kimura |
| 2007/0230221 A1 | 10/2007 | Lim |
| 2007/0247222 A1 | 10/2007 | Sorrells |
| 2007/0247253 A1 | 10/2007 | Carey |
| 2007/0281635 A1 | 12/2007 | McCallister |
| 2007/0290747 A1 | 12/2007 | Traylor |
| 2007/0291718 A1 | 12/2007 | Chan |
| 2007/0296383 A1 | 12/2007 | Xu |
| 2008/0001660 A1 | 1/2008 | Rasmussen |
| 2008/0003960 A1 | 1/2008 | Zolfaghari |
| 2008/0003962 A1 | 1/2008 | Ngai |
| 2008/0007333 A1 | 1/2008 | Lee |
| 2008/0008273 A1 | 1/2008 | Kim |
| 2008/0009248 A1 | 1/2008 | Rozenblit |

(56) References Cited

U.S. PATENT DOCUMENTS

| | | |
|---|---|---|
| 2008/0012637 A1 | 1/2008 | Aridas |
| 2008/0013236 A1 | 1/2008 | Weng |
| 2008/0019459 A1 | 1/2008 | Chen |
| 2008/0024198 A1* | 1/2008 | Bitonti .................... H02M 3/07 327/536 |
| 2008/0031023 A1 | 2/2008 | Kitagawa |
| 2008/0051044 A1 | 2/2008 | Takehara |
| 2008/0055946 A1 | 3/2008 | Lesso |
| 2008/0062724 A1 | 3/2008 | Feng |
| 2008/0084717 A1 | 4/2008 | Wu |
| 2008/0100272 A1 | 5/2008 | Yoshio |
| 2008/0136500 A1 | 6/2008 | Frulio |
| 2008/0136559 A1 | 6/2008 | Takahashi |
| 2008/0136991 A1 | 6/2008 | Senda |
| 2008/0150621 A1 | 6/2008 | Lesso |
| 2008/0157732 A1 | 7/2008 | Williams |
| 2008/0157733 A1 | 7/2008 | Williams |
| 2008/0158915 A1 | 7/2008 | Williams |
| 2008/0233913 A1 | 9/2008 | Sivasubramaniam |
| 2008/0239772 A1 | 10/2008 | Oraw |
| 2008/0266917 A1 | 10/2008 | Lin |
| 2008/0284398 A1 | 11/2008 | Qiu |
| 2009/0004981 A1 | 1/2009 | Eliezer |
| 2009/0033289 A1 | 2/2009 | Xing et al. |
| 2009/0033293 A1 | 2/2009 | Xing |
| 2009/0039843 A1 | 2/2009 | Kudo |
| 2009/0039947 A1 | 2/2009 | Williams |
| 2009/0059630 A1* | 3/2009 | Williams ............ H02M 3/1588 363/60 |
| 2009/0072800 A1* | 3/2009 | Ramadass ............... H02M 3/07 323/284 |
| 2009/0102439 A1 | 4/2009 | Williams |
| 2009/0121782 A1 | 5/2009 | Oyama et al. |
| 2009/0147554 A1 | 6/2009 | Adest |
| 2009/0174383 A1 | 7/2009 | Tsui |
| 2009/0176464 A1 | 7/2009 | Liang |
| 2009/0195298 A1 | 8/2009 | Nakai |
| 2009/0196082 A1 | 8/2009 | Mazumder |
| 2009/0200874 A1 | 8/2009 | Takai |
| 2009/0206804 A1 | 8/2009 | Xu |
| 2009/0230934 A1 | 9/2009 | Hooijschuur |
| 2009/0257211 A1 | 10/2009 | Kontani |
| 2009/0273955 A1 | 11/2009 | Tseng |
| 2009/0278520 A1* | 11/2009 | Perreault ................ H02M 3/07 323/282 |
| 2009/0302686 A1 | 12/2009 | Fishman |
| 2009/0303753 A1 | 12/2009 | Fu |
| 2009/0311980 A1 | 12/2009 | Sjoland |
| 2009/0322304 A1 | 12/2009 | Oraw |
| 2009/0322384 A1 | 12/2009 | Oraw et al. |
| 2009/0322414 A1 | 12/2009 | Oraw et al. |
| 2009/0323380 A1 | 12/2009 | Harrison |
| 2010/0013548 A1 | 1/2010 | Barrow |
| 2010/0027596 A1 | 2/2010 | Bellaouar |
| 2010/0039085 A1 | 2/2010 | Petricek |
| 2010/0060326 A1 | 3/2010 | Palmer |
| 2010/0073084 A1 | 3/2010 | Hur |
| 2010/0080023 A1 | 4/2010 | Jain |
| 2010/0085786 A1 | 4/2010 | Chiu |
| 2010/0097104 A1 | 4/2010 | Yang |
| 2010/0110741 A1 | 5/2010 | Lin |
| 2010/0117612 A1 | 5/2010 | Klootwijk |
| 2010/0118458 A1 | 5/2010 | Coffey |
| 2010/0120475 A1 | 5/2010 | Taniuchi |
| 2010/0123447 A1 | 5/2010 | Vecera |
| 2010/0140736 A1 | 6/2010 | Lin |
| 2010/0142239 A1 | 6/2010 | Hopper |
| 2010/0156369 A1 | 6/2010 | Kularatna et al. |
| 2010/0164579 A1 | 7/2010 | Acatrinei |
| 2010/0176869 A1 | 7/2010 | Horie |
| 2010/0201441 A1 | 8/2010 | Gustavsson |
| 2010/0202161 A1 | 8/2010 | Sims |
| 2010/0205614 A1 | 8/2010 | Harrington |
| 2010/0214014 A1 | 8/2010 | Dennard et al. |
| 2010/0214746 A1 | 8/2010 | Lotfi |
| 2010/0237833 A1 | 9/2010 | Abe |
| 2010/0244189 A1 | 9/2010 | Klootwijk |
| 2010/0244585 A1 | 9/2010 | Tan |
| 2010/0276572 A1 | 11/2010 | Iwabuchi |
| 2010/0291888 A1 | 11/2010 | Hadjichristos |
| 2010/0308751 A1 | 12/2010 | Nerone |
| 2010/0321041 A1 | 12/2010 | Feldtkeller |
| 2011/0001542 A1 | 1/2011 | Ranta |
| 2011/0018511 A1 | 1/2011 | Carpenter et al. |
| 2011/0026275 A1 | 2/2011 | Huang |
| 2011/0089483 A1 | 4/2011 | Reynes |
| 2011/0101884 A1 | 5/2011 | Kim |
| 2011/0128761 A1 | 6/2011 | Ripley et al. |
| 2011/0148518 A1 | 6/2011 | Lejon |
| 2011/0154068 A1 | 6/2011 | Huang et al. |
| 2011/0163414 A1 | 7/2011 | Lin |
| 2011/0175591 A1 | 7/2011 | Cuk |
| 2011/0181115 A1 | 7/2011 | Ivanov |
| 2011/0181128 A1 | 7/2011 | Perreault |
| 2011/0204724 A1 | 8/2011 | Verma |
| 2011/0204858 A1 | 8/2011 | Kudo |
| 2011/0204959 A1 | 8/2011 | Sousa et al. |
| 2011/0204962 A1 | 8/2011 | Gorisse et al. |
| 2011/0216561 A1 | 9/2011 | Bayerer |
| 2012/0014153 A1 | 1/2012 | Christoph |
| 2012/0043818 A1 | 2/2012 | Stratakos |
| 2012/0064953 A1 | 3/2012 | Dagher |
| 2012/0119718 A1 | 5/2012 | Song |
| 2012/0139515 A1 | 6/2012 | Li |
| 2012/0146177 A1 | 6/2012 | Choi |
| 2012/0153907 A1 | 6/2012 | Carobolante |
| 2012/0153912 A1* | 6/2012 | Demski .................... H02M 3/07 323/282 |
| 2012/0158188 A1 | 6/2012 | Madala |
| 2012/0170334 A1 | 7/2012 | Menegoli |
| 2012/0176195 A1 | 7/2012 | Dawson |
| 2012/0212293 A1 | 8/2012 | Khlat |
| 2012/0223773 A1 | 9/2012 | Jones |
| 2012/0243267 A1 | 9/2012 | Kassayan |
| 2012/0249096 A1 | 10/2012 | Enenkel |
| 2012/0252382 A1 | 10/2012 | Bashir |
| 2012/0293254 A1 | 11/2012 | Liu et al. |
| 2012/0313602 A1 | 12/2012 | Perreault |
| 2012/0326684 A1 | 12/2012 | Perreault |
| 2013/0005286 A1 | 1/2013 | Chan |
| 2013/0043931 A1 | 2/2013 | Khlat et al. |
| 2013/0049714 A1 | 2/2013 | Chiu |
| 2013/0049885 A1 | 2/2013 | Rozman |
| 2013/0058049 A1 | 3/2013 | Roth |
| 2013/0058141 A1 | 3/2013 | Oraw |
| 2013/0063120 A1 | 3/2013 | Hoellinger et al. |
| 2013/0094157 A1 | 4/2013 | Giuliano |
| 2013/0106375 A1 | 5/2013 | Marsili et al. |
| 2013/0106380 A1 | 5/2013 | Marsili |
| 2013/0106381 A1 | 5/2013 | Marsili |
| 2013/0106382 A1 | 5/2013 | Marsili et al. |
| 2013/0147543 A1 | 6/2013 | Dai |
| 2013/0154600 A1 | 6/2013 | Giuliano |
| 2013/0181521 A1 | 7/2013 | Khlat |
| 2013/0187612 A1 | 7/2013 | Aiura |
| 2013/0229841 A1 | 9/2013 | Giuliano |
| 2013/0234785 A1 | 9/2013 | Dai |
| 2013/0241625 A1 | 9/2013 | Perreault |
| 2013/0279226 A1 | 10/2013 | Ofek |
| 2013/0293207 A1 | 11/2013 | Wei |
| 2013/0300385 A1 | 11/2013 | Li et al. |
| 2013/0343106 A1 | 12/2013 | Perreault |
| 2013/0343107 A1 | 12/2013 | Perreault |
| 2014/0015731 A1 | 1/2014 | Khlat |
| 2014/0070787 A1 | 3/2014 | Arno |
| 2014/0118065 A1 | 5/2014 | Briffa |
| 2014/0118072 A1 | 5/2014 | Briffa |
| 2014/0120854 A1 | 5/2014 | Briffa |
| 2014/0159681 A1 | 6/2014 | Oraw |
| 2014/0167513 A1 | 6/2014 | Chang |
| 2014/0225581 A1 | 8/2014 | Giuliano |
| 2014/0226378 A1 | 8/2014 | Perreault |
| 2014/0306648 A1 | 10/2014 | Le |
| 2014/0306673 A1 | 10/2014 | Le |

(56) References Cited

U.S. PATENT DOCUMENTS

| | | |
|---|---|---|
| 2014/0313781 A1 | 10/2014 | Perreault |
| 2014/0335805 A1 | 11/2014 | Briffa |
| 2014/0339918 A1 | 11/2014 | Perreault |
| 2014/0355322 A1 | 12/2014 | Perreault |
| 2015/0022173 A1 | 1/2015 | Le |
| 2015/0023063 A1 | 1/2015 | Perreault |
| 2015/0054571 A1 | 2/2015 | Watanabe |
| 2015/0084701 A1 | 3/2015 | Perreault |
| 2015/0097538 A1 | 4/2015 | Le |
| 2015/0102798 A1 | 4/2015 | Giuliano |
| 2015/0155895 A1 | 6/2015 | Perreault |
| 2015/0229160 A1 | 8/2015 | Kawakami |
| 2015/0255547 A1 | 9/2015 | Yuan |
| 2015/0280553 A1 | 10/2015 | Giuliano |
| 2015/0295497 A1 | 10/2015 | Perreault |
| 2015/0303806 A1 | 10/2015 | Madsen |
| 2015/0318851 A1 | 11/2015 | Roberts |
| 2015/0344335 A1 | 12/2015 | Hughes |
| 2015/0357912 A1 | 12/2015 | Perreault |
| 2015/0364991 A1 | 12/2015 | Chung |
| 2015/0381148 A1 | 12/2015 | Zeng |
| 2016/0087622 A1 | 3/2016 | Kaeriyama |
| 2016/0093948 A1 | 3/2016 | Lehtola |
| 2016/0094126 A1 | 3/2016 | Liu |
| 2016/0111356 A1 | 4/2016 | Cho |
| 2016/0111468 A1 | 4/2016 | Qian |
| 2016/0142048 A1 | 5/2016 | Zoels |
| 2016/0197552 A1 | 7/2016 | Giuliano |
| 2016/0254754 A1 | 9/2016 | Perreault |
| 2016/0322894 A1 | 11/2016 | Giuliano |
| 2016/0365794 A1 | 12/2016 | Lawson |
| 2017/0237351 A1 | 8/2017 | Giuliano |
| 2017/0244318 A1 | 8/2017 | Giuliano |
| 2017/0271497 A1 | 9/2017 | Fayed |
| 2017/0279374 A1 | 9/2017 | Friebe |
| 2017/0300078 A1 | 10/2017 | Puggelli |
| 2017/0302093 A1 | 10/2017 | Petersen |
| 2018/0034363 A1 | 2/2018 | Giuliano |
| 2018/0145587 A1 | 5/2018 | Giuliano |
| 2018/0197673 A1 | 7/2018 | Njiende |
| 2018/0205315 A1 | 7/2018 | Giuliano |
| 2019/0027468 A1 | 1/2019 | Giuliano |
| 2019/0028018 A1 | 1/2019 | Datta |
| 2019/0115830 A1 | 4/2019 | Giuliano |
| 2019/0207513 A1 | 7/2019 | Ramadass |
| 2019/0372567 A1 | 12/2019 | Yoshida |
| 2019/0393777 A1 | 12/2019 | Giuliano |
| 2020/0007091 A1 | 1/2020 | Li |
| 2020/0007119 A1 | 1/2020 | Li |
| 2020/0020779 A1 | 1/2020 | Trang |
| 2020/0021187 A1 | 1/2020 | Chang |
| 2020/0036286 A1 | 1/2020 | Giuliano |
| 2020/0083805 A1 | 3/2020 | Mauri |
| 2020/0083814 A1 | 3/2020 | Choi |
| 2020/0112247 A1 | 4/2020 | Giuliano |
| 2020/0127557 A1 | 4/2020 | Giuliano |
| 2020/0136494 A1 | 4/2020 | Kazama |
| 2020/0195136 A1 | 6/2020 | Huang |
| 2020/0204172 A1 | 6/2020 | Geng |
| 2020/0246626 A1 | 8/2020 | Labbe |
| 2020/0253520 A1 | 8/2020 | Wang |
| 2020/0343352 A1 | 10/2020 | Trang |
| 2021/0013798 A1 | 1/2021 | Giuliano |
| 2022/0131466 A1 | 4/2022 | Giuliano |
| 2022/0140727 A1 | 5/2022 | Giuliano |
| 2022/0224229 A1 | 7/2022 | Giuliano |

FOREIGN PATENT DOCUMENTS

| | | | | |
|---|---|---|---|---|
| CN | 1988349 | 6/2007 | | |
| CN | 101079576 | 11/2007 | | |
| CN | 101297465 | 10/2008 | | |
| CN | 101563845 | 10/2009 | | |
| CN | 101588139 | 11/2009 | | |
| CN | 101636702 | 1/2010 | | |
| CN | 101647181 | 2/2010 | | |
| CN | 101647182 | 2/2010 | | |
| CN | 101662208 | 3/2010 | | |
| CN | 101682252 | 3/2010 | | |
| CN | 101976953 | 2/2011 | | |
| CN | 102055328 | 5/2011 | | |
| CN | 102171918 | 8/2011 | | |
| CN | 102769986 | 11/2012 | | |
| CN | 103280967 | 9/2013 | | |
| CN | 103650313 | 3/2014 | | |
| CN | 103650314 | 3/2014 | | |
| CN | 103904882 | 7/2014 | | |
| CN | 103975433 | 8/2014 | | |
| CN | 104011985 | 8/2014 | | |
| CN | 104716834 | 6/2015 | | |
| CN | 104756391 | 7/2015 | | |
| CN | 105229909 | 1/2016 | | |
| CN | 105393445 | 3/2016 | | |
| CN | 107580748 | 1/2018 | | |
| CN | 108964442 | 12/2018 | | |
| CN | 109219919 | 1/2019 | | |
| CN | 109478845 | 3/2019 | | |
| CN | 112838760 | 5/2021 | | |
| DE | 10358299 | 7/2005 | | |
| DE | 112016001188 | 3/2018 | | |
| DE | 112017002374 | 1/2019 | | |
| DE | 112012004377 | 3/2023 | | |
| EP | 0513920 | 11/1992 | | |
| EP | 0773622 | 5/1997 | | |
| EP | 1199788 | 4/2002 | | |
| EP | 1750366 | 2/2007 | | |
| EP | 2136459 A1 * | 12/2009 | ............ | H02M 3/073 |
| EP | 2705597 | 3/2014 | | |
| EP | 3425784 | 1/2019 | | |
| FR | 2852748 | 9/2004 | | |
| GB | 2505371 | 2/2014 | | |
| GB | 2509652 | 7/2014 | | |
| JP | 5297116 | 12/1899 | | |
| JP | H10327573 | 12/1998 | | |
| JP | H 11113249 A | 4/1999 | | |
| JP | H11235053 | 8/1999 | | |
| JP | 2000134095 | 5/2000 | | |
| JP | 2002062858 | 2/2002 | | |
| JP | 2002233139 | 8/2002 | | |
| JP | 2006025592 | 1/2006 | | |
| JP | 2007336753 A | 12/2007 | | |
| JP | 2008220001 | 9/2008 | | |
| JP | 2008245493 | 10/2008 | | |
| JP | 2009124826 A | 6/2009 | | |
| JP | 2010045943 | 2/2010 | | |
| JP | 2011072094 A | 4/2011 | | |
| JP | 2011253217 A | 12/2011 | | |
| JP | 2018508178 | 3/2018 | | |
| KR | 101556838 | 12/1899 | | |
| KR | 20110053681 | 5/2011 | | |
| KR | 20140015528 | 2/2014 | | |
| KR | 20150085072 | 7/2015 | | |
| KR | 20180004116 | 1/2018 | | |
| KR | 20180118234 | 10/2018 | | |
| TW | 201644164 | 12/2016 | | |
| WO | WO2006093600 | 9/2006 | | |
| WO | WO2007136919 | 11/2007 | | |
| WO | WO2009012900 | 1/2009 | | |
| WO | WO2009112900 | 9/2009 | | |
| WO | WO2009/155540 A1 | 12/2009 | | |
| WO | WO2011089483 | 7/2011 | | |
| WO | WO2012036455 | 3/2012 | | |
| WO | WO2012151466 | 11/2012 | | |
| WO | WO2012/171938 A2 | 12/2012 | | |
| WO | WO2013059446 | 4/2013 | | |
| WO | WO2013/085537 A1 | 6/2013 | | |
| WO | WO2013086445 | 6/2013 | | |
| WO | WO2013096416 | 6/2013 | | |
| WO | WO2014070998 | 5/2014 | | |
| WO | WO2014154390 | 10/2014 | | |
| WO | WO2014168911 | 10/2014 | | |
| WO | WO2014169186 | 10/2014 | | |

(56) References Cited

FOREIGN PATENT DOCUMENTS

| WO | WO2016149105 | 9/2016 |
| WO | WO2017161368 | 9/2017 |
| WO | WO2017196826 | 11/2017 |

OTHER PUBLICATIONS

W. Ng, Vincent et al., "Minimum PCB Footprint Point-of-Load DC-DC Converter Realized with Switched-Capacitor Architecture," 2009 IEEE Energy Conversion Congress and Exposition, San Jose, CA, USA, 2009, pp. 1575-1581.

Yeung, Y.P. Benny et al., "Unified Analysis of Switched-Capacitor Resonant Converters," Aug. 2004, IEEE Transactions on Industrial Electronics, vol. 51, No. 4, pp. 864-873.

Abutbul et al. "Step-Up Switching-Mode Converter With High Voltage Gain Using a Switched- Capacitor Circuit" IEEE Transactions on Circuits and Systems I. vol. 50 pp. 1098-1102 Aug. 2003.

Andreassen—"Digital Variable Frequency Control for Zero Voltage Switching and Interleaving of Synchronous Buck Converters" 12th Intl. Power Electronics and Motion Control Conference IEEE Aug. 2006 pp. 184-188 5 pages.

Axelrod et al. "Single-switch single-stage switched-capacitor buck converter" Proc. of NORPIE 2004 4th Nordic Workshop on Power and Industrial Electronics Jun. 2004.

Cao—"Multiphase Multilevel Modular DC-DC Converter for High-Current High-Gain TEG Application" IEEE Transactions on Industry Applications vol. 47 No. 3 May/Jun. 1991 pp. 1400-1408 9 pages.

Cheng "New generation of switched capacitor converters" PESC 98 Record. 29th Annual IEEE Power Electronics Specialists Conference (Cat. No. 98CH36196) Fukuoka Japan May 22, 1998 pp. 1529-1535 vol. 2 doi: 10.1109PESC.1998.703377.

Dong Cao et al: "Multiphase Multilevel Modular DC-DC Converter for High-Current High-Gain TEG Application" IEEE Transactions on Industry Applications IEEE Service Center Piscataway NJ US vol. 47 No. 3 May 1, 2011 (May 1, 2011) pp. 1400-1408 XP011477763 ISSN: 0093-9994 DOI: 10.1109TIA.2011.2125771.

Giuliano—"Architectures and Topologies for Power Delivery" Biannual Review of MIT Center for Integrated Circuits; Power Point Presentation May 9, 2007 17 slides.

Han et al. "A New Approach to Reducing Output Ripple in Switched-Capacitor-Based Step-Down DC-DC Converters" IEEE Transactions on Power Electronics vol. 21 No. 6 pp. 1548-1555 Nov. 2006.

Lei et al. "Analysis of Switched-capacitor DC-DC Converters in Soft-charging Operation" 14thIEEE Workshop on Control and Modeling for Power Electronics pp. Jun. 1-7, 23 2013.

Linear Technology data sheet for part LTC3402 "2A 3MHz Micropower Synchronous Boost Converter" 2000.

Luo—"Investigation of Switched-Capacitorized DCDC Converters" 2009 IEEE 6th Intl. Power Electronics and Motion Control Conference Wuhan China May 17-20, 2009 pp. 1270-1276 7 pages.

Ma et al. "Design and Optimization of Dynamic Power System for Self-Powered Integrated Wireless Sensing Nodes" ACM ISLPED 2005 conference (published at pp. 303-306 of the proceedings).

Markowski "Performance Limits of Switched-Capacitor DC-DC Converters" IEEE PESC'95 Conference 1995.

Meynard et al. "Multi-Level Conversion: High Voltage Choppers and Voltage-Source Inverters" IEEE Power Electronics Specialists Conference pp. 397-403 1992.

Middlebrook "Transformerless DC-to-DC Converters with Large Conversion Ratios" IEEE Transactions on Power Electronics vol. 3 No. 4 pp. 484-488 Oct. 1988.

Ng et al. "Switched Capacitor DC-DC Converter: Superior where the Buck Converter has Dominated" PHD Thesis UC Berkeley Aug. 17, 2011.

O. Abutbul et al. "Step-Up Switching-Mode Converter With High Voltage Gain Using a Switched-Capacitor Circuit" IEEE Transactions on Circuits and Systems I. vol. 50 pp. 1098-1102 Aug. 2003.

Ottman et al. "Optimized Piezoelectric Energy Harvesting Circuit using Step-Down Converter in Discontinuous Conduction Mode" IEEE Power Electronics Specialists Conference pp. 1988-1994 2002.

Pilawa-Podgurski et al. "Merged Two-Stage Power Converter Architecture with Soft Charging Switched-Capacitor Energy Transfer" 39th IEEE Power Electronics Specialists Conference 2008.

Starzyk et al. "A DC-DC Charge Pump Design Based on Voltage Doublers" IEEE Transactions on Circuits and Systems-I: Fundamental Theory and Applications vol. 48 No Mar. 3, 2001 pp. 350-359.

Sun et al. "High Power Density High Efficiency System Two-Stage Power Architecture for Laptop Computers" Power Electronics Specialists Conference pp. Jun. 1-7, 2006.

Texas Instruments data sheet for part TPS54310 "3-V to 6-V input 3—A output synchronous-buck PWM switcher with integrated FETs" dated 2002-2005.

Umeno et al. "A New Approach to Low Ripple-Noise Switching Converters on the Basis of Switched-Capacitor Converters" IEEE International Symposium on Circuits and Systems vol. 2 pp. 1077-1080 Jun. 1991.

Wood et al. "Design Fabrication and Initial Results of a 2g Autonomous Glider" IEEE Industrial Electronics Society pp. 1870-1877 Nov. 2005.

Xu et al. "Voltage Divider and its Application in Two-stage Power Architecture" IEEE Twenty-First Annual IEEE Applied Power Electronics Conference and Exposition pp. 499-504 Mar. 2006.

\* cited by examiner

SWITCHED-CAPACITOR CIRCUIT CONTROL IN POWER CONVERTERS

RELATED APPLICATIONS

This application is continuation of U.S. application Ser. No. 18/606,319, filed on Mar. 15, 2024, which is a continuation of U.S. application Ser. No. 17/491,983, filed on Oct. 1, 2021 and issued as U.S. Pat. No. 11,936,300 on Mar. 19, 2024, which is a continuation of U.S. application Ser. No. 16/872,207, filed on May 11, 2020 and issued as U.S. Pat. No. 11,165,350 on Nov. 2, 2021, which is a continuation of U.S. application Ser. No. 14/857,141, filed on Sep. 17, 2015 and issued as U.S. Pat. No. 10,686,380 on Jun. 16, 2020, which is a continuation of U.S. application Ser. No. 14/309,003, filed on Jun. 19, 2014 and issued as U.S. U.S. Pat. No. 9,143,037 on Sep. 22, 2015, which is a continuation of PCT/US2012/070555, filed on Dec. 19, 2012 which claims the benefit of the priority date of U.S. Provisional Application No. 61/577,271 filed on Dec. 19, 2011, the contents of which for all of the noted applications are herein incorporated by reference in their entirety.

FIELD OF DISCLOSURE

This disclosure relates to the control of power converters that utilize capacitors to transfer energy.

BACKGROUND

Power converters may generally include switches and one or more capacitors. Such converters can be used, for example, to power portable electronic devices and consumer electronics.

A switch-mode power converter is a specific type of power converter that regulates an output voltage or current by switching energy storage elements (i.e. inductors and capacitors) into different electrical configurations using a switch network.

A switched capacitor converter is a type of switch-mode power converter that primarily utilizes capacitors to transfer energy. In such converters, the number of capacitors and switches increases as the transformation ratio increases.

Typical power converters perform voltage transformation and output regulation. In many power converters, such as buck converters, both functions take place in a single stage. However, it is also possible to split these two functions into two specialized stages. Such two-stage power converter architectures feature a separate transformation stage and a separate regulation stage. The transformation stage transforms one voltage into another voltage, while the regulation stage ensures that the output voltage and/or output current of the power converter maintains desired characteristics.

For example, referring to FIG. 1, in one known power converter 10, a switched capacitor element 12A is electrically connected, at an input end thereof, to a voltage source 14. An input of a regulating circuit 16A is electrically connected to an output of the switched capacitor element 12A. A load 18A is then electrically connected to an output of the regulating circuit 16A. Such a converter is described in US Patent Publication 2009/0278520, filed on May 8, 2009, the contents of which are herein incorporated by reference.

Furthermore, a modular multi-stage power converter architecture is described in PCT Application PCT/2012/36455, filed on May 4, 2012, the contents of which are also incorporated herein by reference. The switched capacitor element 12A and the regulating circuit 16A can be mixed and matched in a variety of different ways. This provides a transformative integrated power solution (TIPS™) for the assembly of such power converters. As such, the configuration shown in FIG. 1 represents only one of multiple ways to configure one or more switched capacitor elements 12A with one or more regulating circuits 16A.

SUMMARY

In one aspect, the invention features an apparatus for power conversion. Such an apparatus includes a first element configured to accept an input signal having a first voltage and to output an intermediate signal having a second voltage, and a second element configured to receive the intermediate signal from the first element and to output an output signal having a third voltage. The first element is either a voltage transformation or a regulating element. The second element is a regulating element when the first element is a voltage transformation element and a voltage transformation element otherwise. A controller is configured to control a period of the voltage transformation element and a period of the regulating element. The controller is configured to synchronize the period of the voltage transformation element with a product of a coefficient and the period of the regulating element. This coefficient can be either a positive integer or a reciprocal of the integer.

In some embodiments, the coefficient is a positive integer, whereas in others, it is a reciprocal of the positive integer.

Embodiments also include those in which the controller receives the intermediate signal from the first element and the output signal from the second element. Among these are those in which the controller receives the input signal, and also those in which the controller generates a first control signal based on the output signal and sends the first control signal to the regulating element. This embodiment also includes within its scope alternative embodiments in which the controller generates a second control signal based on the intermediate signal and the first control signal, and sends the second control signal to the voltage transformation element.

Also included within the scope of the invention are those embodiments in which the controller provides linear voltage-mode control, and those in which it provides peak current-mode control.

In some embodiments, regulating element passes continuous current therethrough, whereas in others, the regulating element passes discontinuous current therethrough.

In other embodiments, the voltage transformation element includes voltage transformation sub-elements and the regulating element includes regulating sub-elements, and each voltage transformation sub-element is associated with a corresponding one of the regulating sub-elements.

Embodiments also include those in which the first element includes a voltage transformation element and those in which the first element includes a regulating element.

In another aspect, the invention features an apparatus for power conversion, such an apparatus includes a voltage transformation element, a regulating element, and a controller. A period of the voltage transformation element is equal to a product of a coefficient and a period of the regulating circuit. The coefficient is either a positive integer or a reciprocal of the integer.

Embodiments include those in which the regulating element passes continuous current therethrough, and also those in which the regulating element passes discontinuous current therethrough.

In some embodiments, the controller controls multiple phases present in the regulating element and the voltage transformation element.

Other embodiments include a data processing unit and a memory unit, at least one of which is configured to consume power provided by the power converter circuit.

Additional embodiments include data processing unit, a display, and a wireless transmitter and receiver, at least one of which is configured to consume power provided by the power converter circuit.

DESCRIPTION OF THE FIGURES

The foregoing features of the circuits and techniques described herein, may be more fully understood from the following description of the figures in which.

DETAILED DESCRIPTION

The apparatus described herein provides a way to control the switched capacitor element 12A and the regulating circuit 16A in a modular multi-stage power converter architecture.

Before describing several exemplary embodiments of controllers for power converters that utilize capacitors to transfer energy, it should be appreciated that in an effort to promote clarity in explaining the concepts, references are sometimes made herein to specific controllers for power converters that utilize capacitors to transfer energy. It should be understood that such references are merely exemplary and should not be construed as limiting. After reading the description provided herein, one of ordinary skill in the art will understand how to apply the concepts described herein to provide specific controllers for power converters that utilize capacitors to transfer energy.

It should be appreciated that reference is also sometimes made herein to particular frequencies as well as to particular transformation voltage ratios. It should be understood that such references are merely exemplary and should not be construed as limiting.

Reference may also sometimes be made herein to particular applications. Such references are intended merely as exemplary and should not be taken as limiting the concepts described herein to the particular application.

Thus, although the description provided herein explains the inventive concepts in the context of particular circuits or a particular application or a particular frequency, those of ordinary skill in the art will appreciate that the concepts equally apply to other circuits or applications or frequencies.

Figure 2:
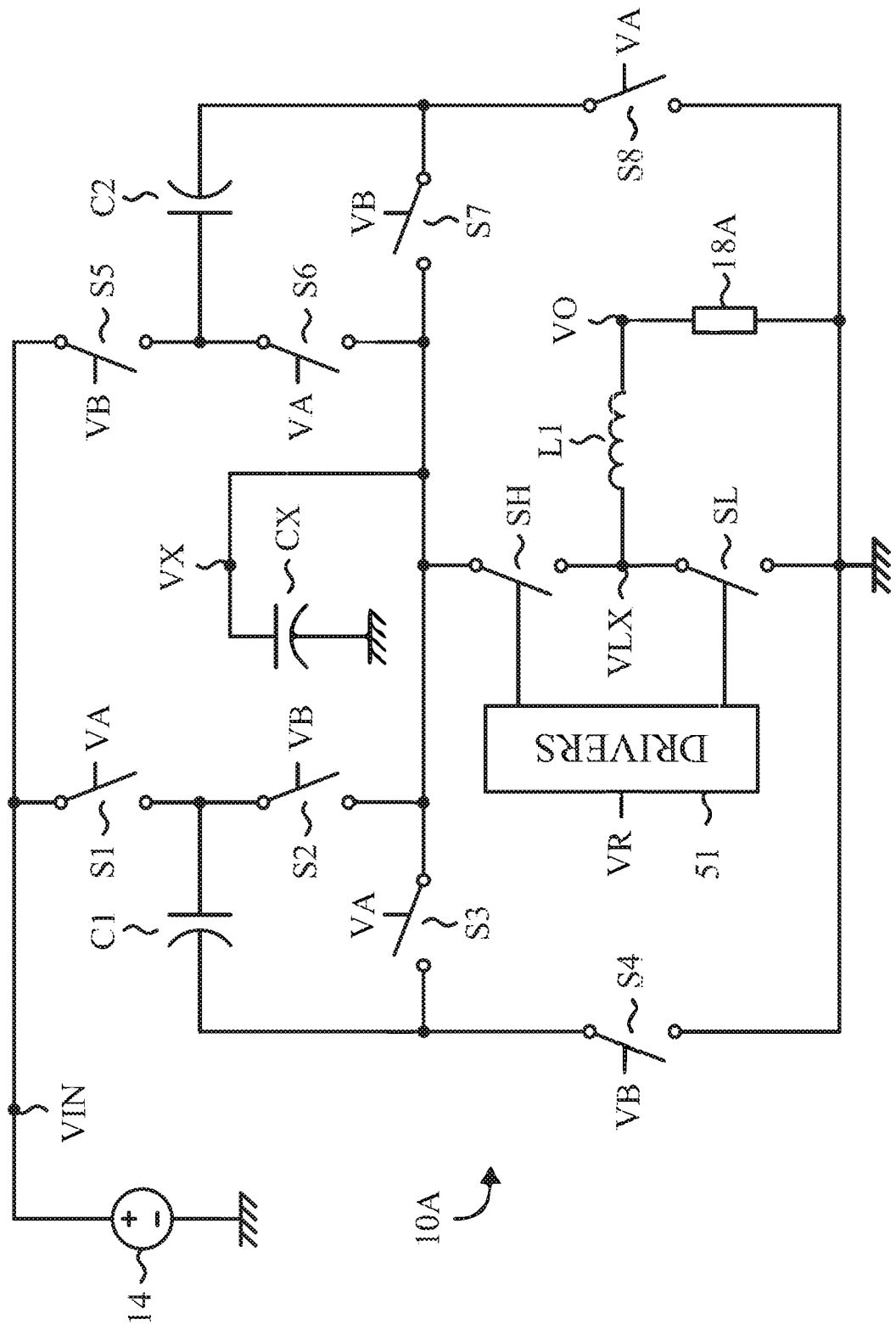
FIG. 2 shows a particular implementation of the power converter architecture in FIG. 1.

FIG. 2 illustrates a power converter 10A that receives an input voltage VIN from the voltage source 14 and produces an output voltage VO that is lower than the input voltage VIN.

Figure 1:
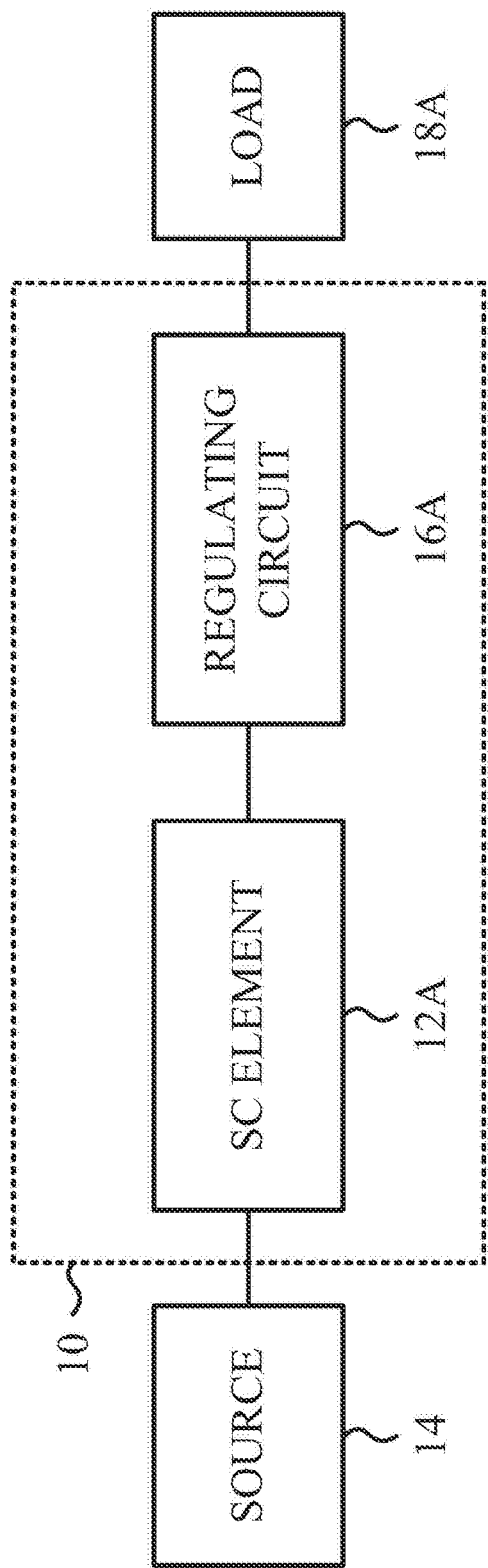
FIG. 1 shows a known power converter architecture.

The power converter 10A is a particular embodiment of the power converter architecture illustrated in FIG. 1. The switched capacitor element 12A features a 2:1 dual-phase series-parallel switched capacitor network that includes power switches S1-S8 and pump capacitors C1-C2. In contrast, the regulating circuit 16A features a buck converter that includes a low-side switch SL, a high-side switch SH, a filter inductor L1, and a driver stage 51.

In the operation of the switched capacitor element 12A, the power switches S1, S3, S6, S8 and the power switches S2, S4, S5, S7 are always in complementary states. Thus, in a first network state, the power switches S1, S3, S6, S8 are open and the power switches S2, S4, S5, S7 are closed. In a second network state, the power switches S1, S3, S6, S8 are closed and the power switches S2, S4, S5, S7 are open. The switched capacitor element 12A cycles through the first network state and the second network state, resulting in an intermediate voltage VX that is one-half of the input voltage VIN.

Referring to FIG. 2, the switched capacitor element 12A is in the first network state when a first phase voltage VA is low and a second phase voltage VB is high. In contrast, the switched capacitor element 12A is in the second network state when the first phase voltage VA is high and the second phase voltage VB is low. The two phase voltages VA, VB are non-overlapping and have approximately a fifty percent duty cycle.

In the operation of the regulating circuit 16A, the low-side switch SL and the high-side switch SH chop the intermediate voltage VX into a switching voltage VLX. A LC filter receives the switching voltage VLX and generates the output voltage VO that is equal to the average of the switching voltage VLX. To ensure the desired output voltage VO, a regulation control voltage VR controls the duty cycle of the low-side switch SL and the high-side switch SH. Additionally, the driver stage 51 provides the energy to open and close the low-side and high-side switches SL, SH.

Previous disclosures treat the control of the switched capacitor element 12A and regulating circuit 16A separately. This has numerous disadvantages, one of which is that the intermediate voltage VX ripple will feed through to the output voltage VO. A possible solution to this problem is to create a feed-back control loop that is fast enough to attenuate the effect of the intermediate voltage VX ripple on the output voltage VO. To achieve this goal, the frequency of the regulating circuit 16A must be at a significantly higher frequency than the frequency of the switched capacitor element 12A.

Another possible solution to this problem would be to add a feed-forward control loop to the regulating circuit 16A. However, as was the case with the fast feed-back solution, the feed-forward solution will only be effective if the frequency of the regulating circuit 16A is significantly higher than the frequency of the switched capacitor element 12A. Therefore, both solutions place a severe frequency constraint on the switched capacitor element 12A and the regulating circuit 16A.

Furthermore, there is typically a dead-time interval DT between the first network state and the second network state of the switched capacitor element 12A. During the dead-time interval DT, all of the switches in the switched capacitor element 12A are open. This ensures a clean transition between the first network state and the second network state of the switched capacitor element 12A, and vice versa. If the regulating circuit 16A tries to draw current during the dead-time interval DT, a voltage 'glitch' will occur at the node between the switched capacitor element 12A and the regulating circuit 16A.

The voltage 'glitch' can be reduced through the use of a glitch capacitor CX. Unfortunately, a portion of the energy stored on the glitch capacitor CX is thrown away each time the switched capacitor element 12A transitions between the first network state and the second network state, and vice versa. The energy loss is a result of the glitch capacitor CX being shorted to capacitors at a different voltage, such as pump capacitors C1, C2. Therefore, the use of a glitch capacitor CX to supply energy during the dead-time interval DT is an effective solution, but requires one additional capacitor and reduces the efficiency of the power converter 10A.

Embodiments described herein rely at least in part on the recognition that by synchronizing the switched capacitor element 12A and the regulating circuit 16A, the intermediate voltage VX ripple effect on the output voltage VO and the voltage "glitch" can be minimized.

Figure 3:
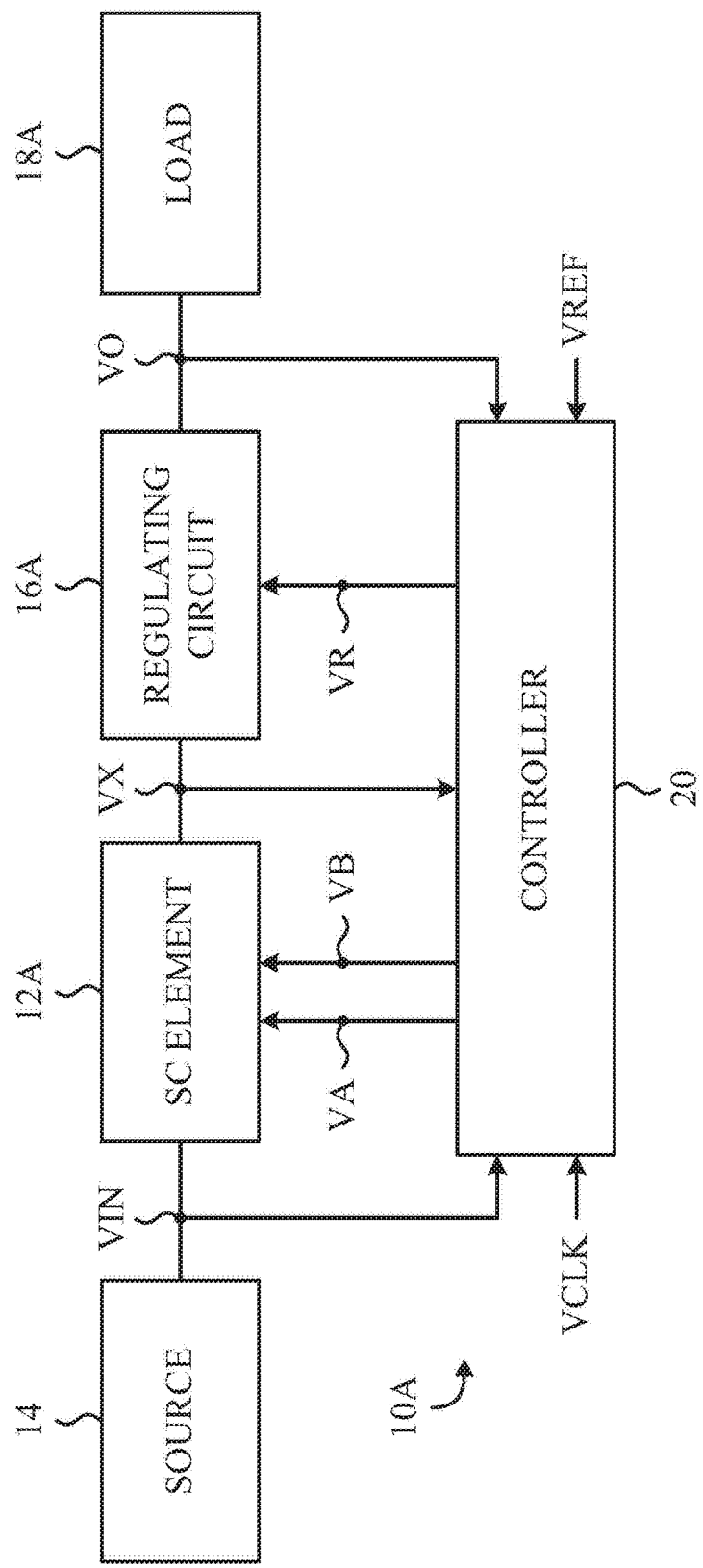
FIG. 3 shows a controller coupled to the power converter in FIG. 2.

FIG. 3 illustrates a first generic controller 20 that synchronizes the switched capacitor element 12A and the regulating circuit 16A within the power converter 10A shown in FIG. 2. The first generic controller 20 receives five input signals and provides three output signals. The input signals include the input voltage VIN, the output voltage VO, the intermediate voltage VX, a reference voltage VREF, and a clock voltage VCLK. The output signals include the regulation control voltage VR, the first phase voltage VA, and the second phase voltage VB. The clock voltage VCLK sets the period of the regulation control voltage VR and the reference voltage VREF sets the desired output voltage VO.

Synchronizing the switched capacitor element 12A with the regulating circuit 16A causes the intermediate voltage VX ripple to be in phase with the switching voltage VLX. In this scenario, feed-forward control is effective if the frequency of the regulating circuit 16A is greater than or equal to the frequency of the switched capacitor element 12A, thereby relieving the severe frequency constraint of separately controlled stages.

Additionally, the glitch capacitor CX, shown in FIG. 2, can be removed altogether if the dead-time interval DT of the switch capacitor element 12A occurs when the regulating circuit 16A is not drawing input current. Synchronizing the switched capacitor element 12A and the regulating circuit 16A ensures the proper timing between the dead-time interval DT and the interval during which the regulating circuit 16A is not drawing input current.

One more benefit of synchronizing the switched capacitor element 12A and the regulating circuit 16A is the ability to open and close the power switches S1-S8 in the switched capacitor element 12A when zero-current is flowing through the power switches S1-S8. This technique is often referred to as zero-current switching. To achieve zero-current switching, the dead-time interval DT must occur when the regulating circuit 16A is not drawing input current.

Figure 4:
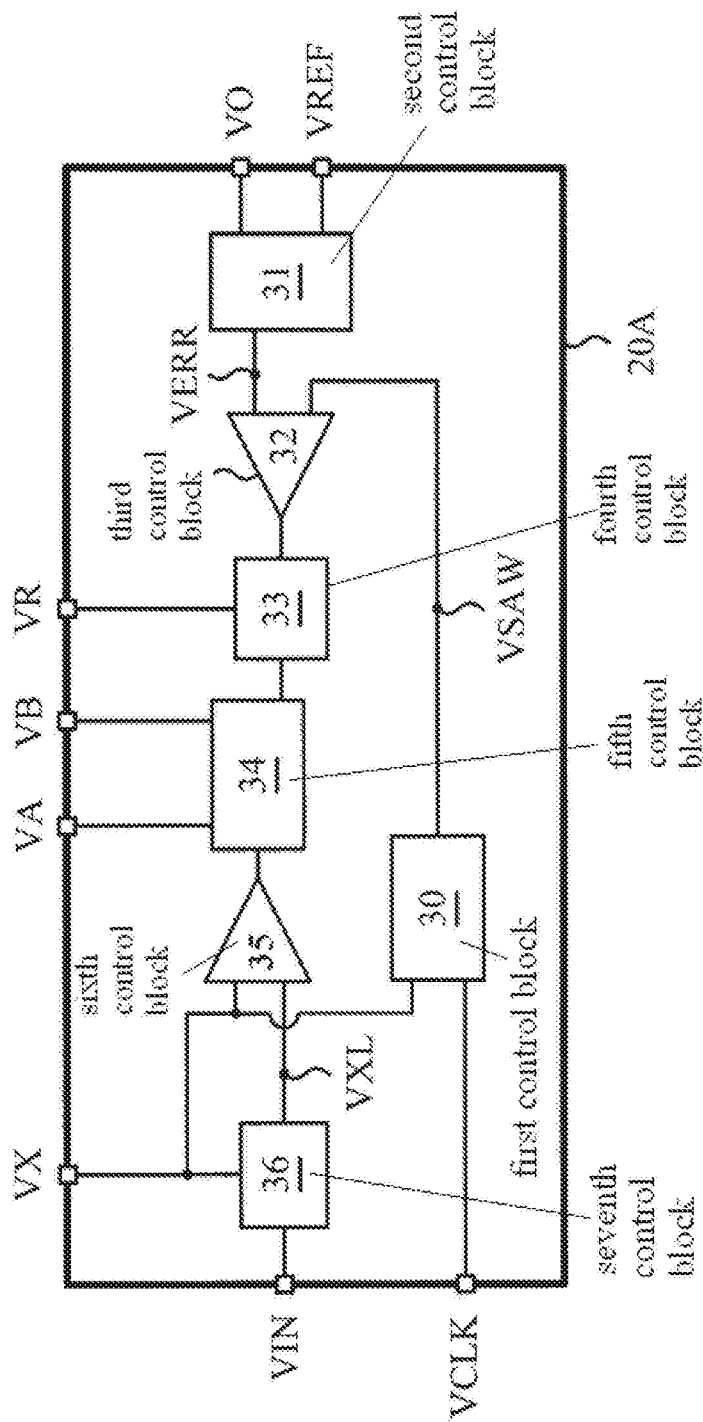
FIG. 4 shows a particular implementation of the controller in FIG. 3.

FIG. 4 illustrates a controller 20A that is a preferred embodiment of the first generic controller 20. The controller 20A can be separated into a first control section and a second control section. The control circuitry for the regulating circuit 16A is in the first control section and includes first, second, third, and fourth control blocks 30, 31, 32, 33. In contrast, the control circuitry for the switched capacitor element 12A is in the second control section and includes fifth, sixth, and seventh control blocks 34, 35, 36. The "link" between the fourth control block 33 and the fifth control block 34 enables synchronization of the first and second control sections.

Figure 5:
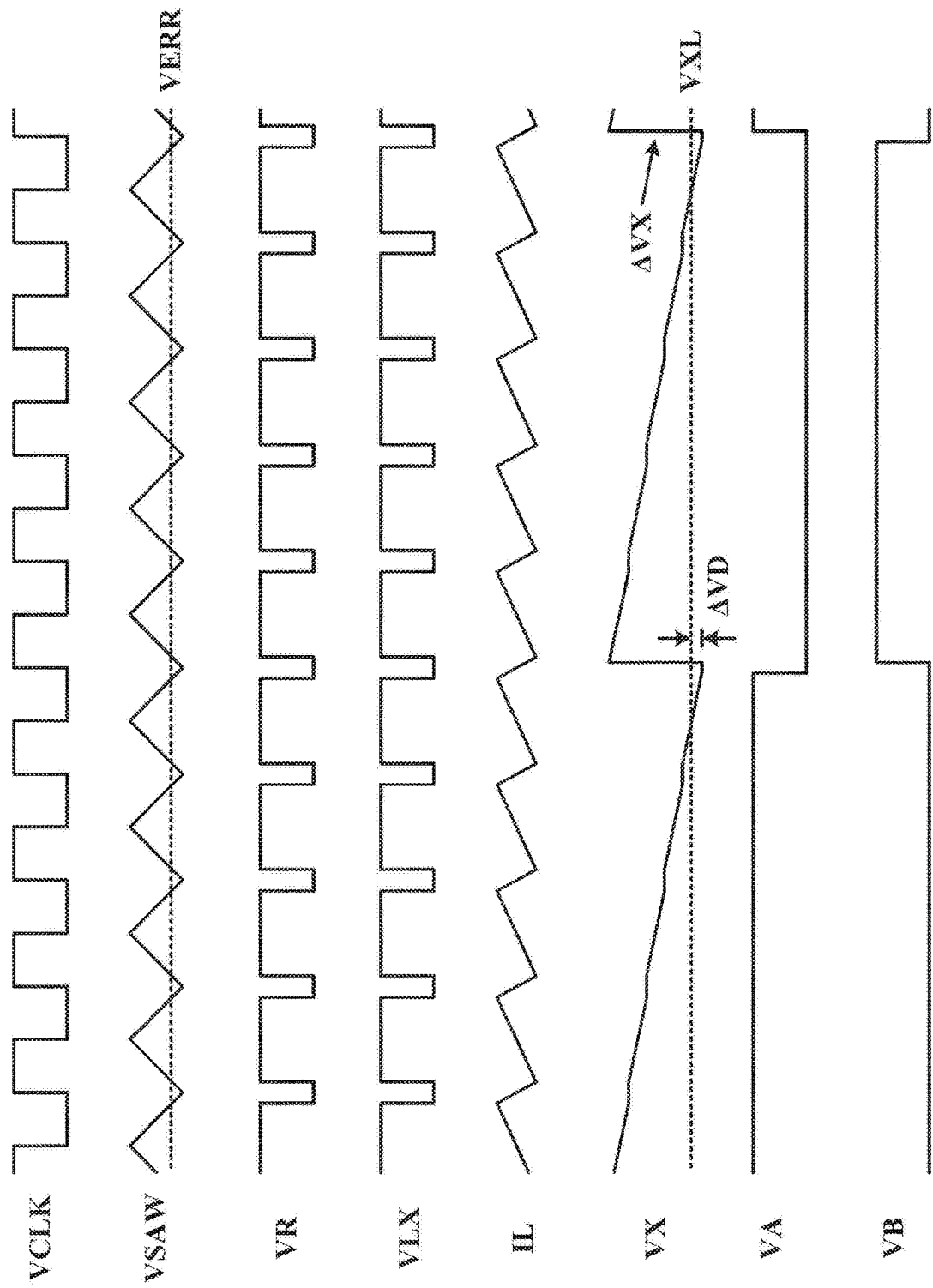
FIG. 5 shows a timing diagram of relevant signals from the embodiment in FIG. 4.
Figure 6:
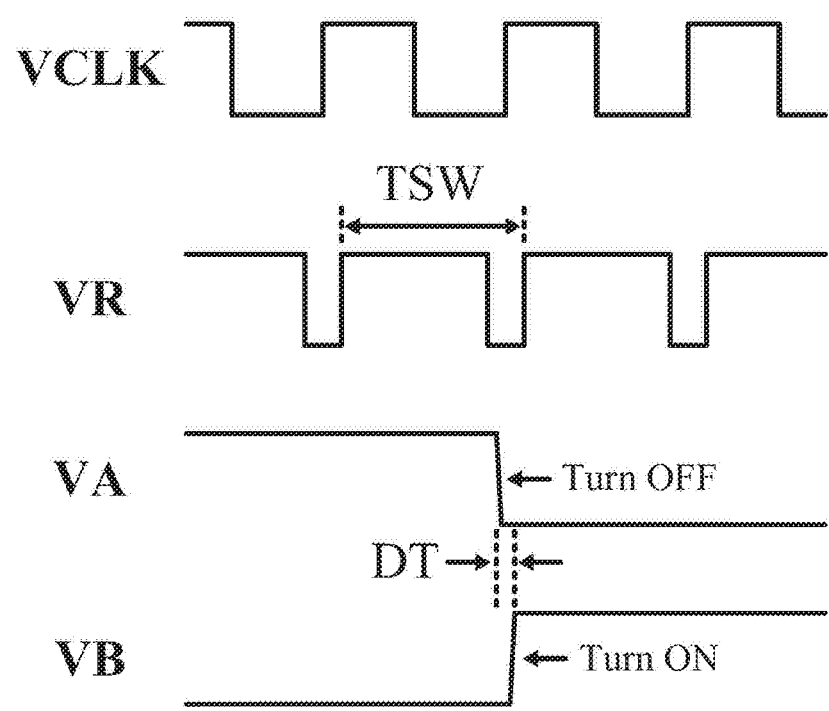
FIG. 6 shows a close-up of selected signals in FIG. 5.

In an effort to promote clarity in explaining the operation of the controller 20A, FIG. 5 illustrates some relevant signals generated by the controller 20A. The relevant signals include the clock voltage VCLK, a saw-tooth voltage VSAW, the regulation control voltage VR, the switching voltage VLX, a filter inductor current IL, the intermediate voltage VX, the first phase voltage VA, and the second phase voltage VB. Furthermore, FIG. 6 illustrates a close-up of some of the waveforms in FIG. 5, where the regulation control voltage period TSW is the inverse of the regulation control voltage VR frequency.

Referring back to FIG. 4, the first control section within the controller 20A uses a linear voltage-mode control scheme to control the regulating circuit 16A. The controller 20A compares the output voltage VO with the reference voltage VREF, thereby producing a residual voltage that is conditioned by the second control block 31. A resulting error voltage VERR is then fed into the third control block 32 where it is compared with the saw-tooth voltage VSAW. Lastly, the output of the third control block 32 is further conditioned by the fourth control block 33, resulting in the regulation control voltage VR.

The first control block 30 sets the frequency of the regulation control voltage VR by generating the saw-tooth voltage VSAW from the clock voltage VCLK. Additionally, the first control block 30 provides feed-forward control of the regulating circuit 16A by adjusting the peak voltage of the saw-tooth voltage VSAW based upon the intermediate voltage VX. Alternatively, feed-forward control can be implemented by adjusting the error voltage VERR with respect to the input voltage VIN or the intermediate voltage VX in the second control block 31.

The second control section within the controller 20A uses a hysteretic control scheme to control the switched capacitor element 12A. The controller 20A causes the first and second phase voltages VA, VB to cycle the switched capacitor element 12A back and forth between the first network state and the second network state based upon a hysteresis band.

During operation, the sixth control block 35 continuously compares the intermediate voltage VX with a trigger voltage VXL. When the intermediate voltage VX drops below the trigger voltage VXL, the fifth control block 34 is triggered and then waits for a confirmation signal. Once the fourth control block 33 sends a signal informing the fifth control block 34 that it is acceptable to make a state change, the dead-time interval DT, shown in FIG. 6, is initiated. During the dead-time interval DT, the first and second phase voltages VA, VB are set low. Following the dead-time interval DT, either the first phase voltage VA is set high and the second phase voltage VB is left low or the first phase voltage VA is left low and the second phase voltage VB is set high, depending upon the initial state. After the state change, the fifth control block 34 is reset and the sequence repeats.

The controller 20A thus forces the frequency of the switched capacitor element 12A to be submultiples of the frequency of the regulating circuit 16A. This constraint is illustrated in FIG. 5, where the frequencies of the first phase voltage VA and the second phase voltage VB are much lower than the frequency of the regulation control voltage VR. In some practices, the frequency of the second phase voltage VB is as little as a tenth that of the control voltage VR.

Since the switched capacitor element 12A is loaded down by a non-capacitive regulating circuit 16A, the voltage ripple on the intermediate voltage VX is a piecewise linear approximation of a saw-tooth waveform. As used herein, an intermediate peak-peak voltage ripple AVX is equal to the maximum intermediate voltage minus the minimum intermediate voltage under steady state conditions. Typically, the intermediate voltage VX comprises a high frequency component from the regulating circuit 16A superimposed on the lower frequency saw-tooth waveform from the switched capacitor element 12A.

Unfortunately, while the fifth control block 34 is waiting to change states, the intermediate voltage VX drops a delta voltage AVD below the trigger voltage VXL, as shown by the intermediate voltage VX curve in FIG. 5. Typically, the delta voltage AVD is small, especially if the frequency of the switched capacitor element 12A is much lower than the frequency of the regulating circuit 16A. The delta voltage AVD at most can be equal to one-half of the intermediate peak-peak voltage ripple AVX and this occurs when the frequency of the switched capacitor element 12A is equal to the frequency of the regulating circuit 16A.

Figure 7:
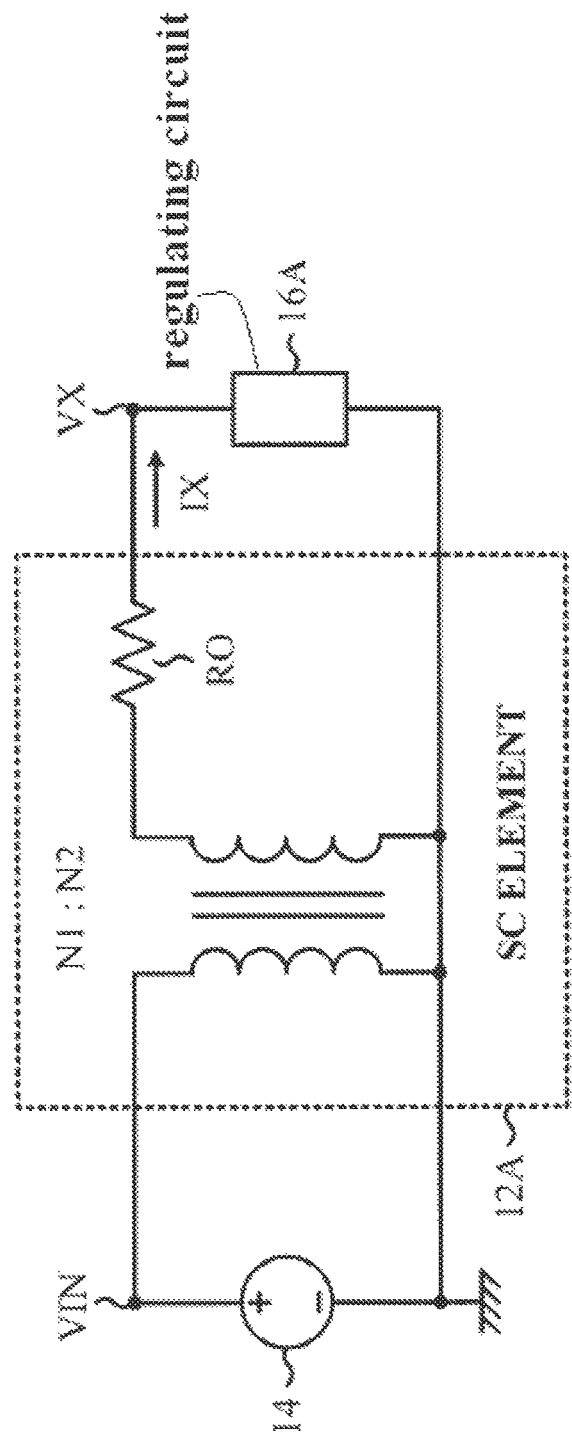
FIG. 7 shows a DC model of a switched capacitor element.

FIG. 7 illustrates a DC model of the switched capacitor element 12A coupled between the voltage source 14 and the regulating circuit 16A. The DC model includes a transformer with a finite output resistance RO. Assuming the switched capacitor element 12A delivers an intermediate current IX, the average of the intermediate voltage VX can be calculated using $$\overline{VX} = VIN \frac{N2}{N1} - IX \times RO$$

The configuration of the switches and capacitors in the switched capacitor element 12A sets a voltage transformation ratio N1:N2. Meanwhile, the output resistance RO of the switched capacitor element 12A accounts for the energy loss in charging/discharging the pump capacitors.

Based upon the waveforms in FIG. 5, the average of the intermediate voltage VX can be calculated using $$\overline{VX} = VXL - \Delta VD + \Delta VX/2$$

By equating the previous two equations, the intermediate peak-peak voltage ripple ΔVX can be expressed as $$\Delta VX = 2 \left[ VIN \frac{N2}{N1} - IX \times RO - VXL + \Delta VD \right].$$

Consequently, the intermediate peak-peak voltage ripple ΔVX is function of operating parameters such as the intermediate current IX and the input voltage VIN. Additionally, due to the synchronization constraint, the intermediate peak-peak voltage ripple ΔVX is also a function of the delta voltage ΔVD.

Unfortunately, large variations in the intermediate peak-peak voltage ripple ΔVX can overstress the regulating circuit 16A. To minimize variations of the intermediate peak-peak voltage ripple ΔVX, the trigger voltage VXL, shown in FIG. 4, can be adjusted on the fly. For example, the seventh control block 36 utilizes the input voltage VIN and the intermediate voltage VX to make a decision on the appropriate value of the trigger voltage VXL. Therefore, when the input voltage VIN rises, the trigger voltage VXL rises in step.

One key idea illustrated in FIG. 6 is that the dead-time interval DT occurs during the off state of the high-side power switch SH in FIG. 2. To ensure this outcome, there is an upper bound on the duty cycle of the regulating circuit 16A, where a maximum duty cycle DMAX is determined using $$DMAX = \frac{TSW - DT}{TSW}$$

As illustrated by the equation above, the dead-time interval DT sets the maximum duty cycle DMAX. It is often desirable to minimize the dead-time interval DT, thereby widening the duty cycle range of the regulating circuit 16A.

It is not uncommon to have a duty cycle limit, specifically if constant frequency operation of the regulating circuit 16A is required for electromagnetic compatibility reasons. In these cases, the maximum duty cycle DMAX constraint is not overly burdensome because the feed-back control loop for the regulating circuit 16A would otherwise have a duty cycle limit.

Figure 8A:
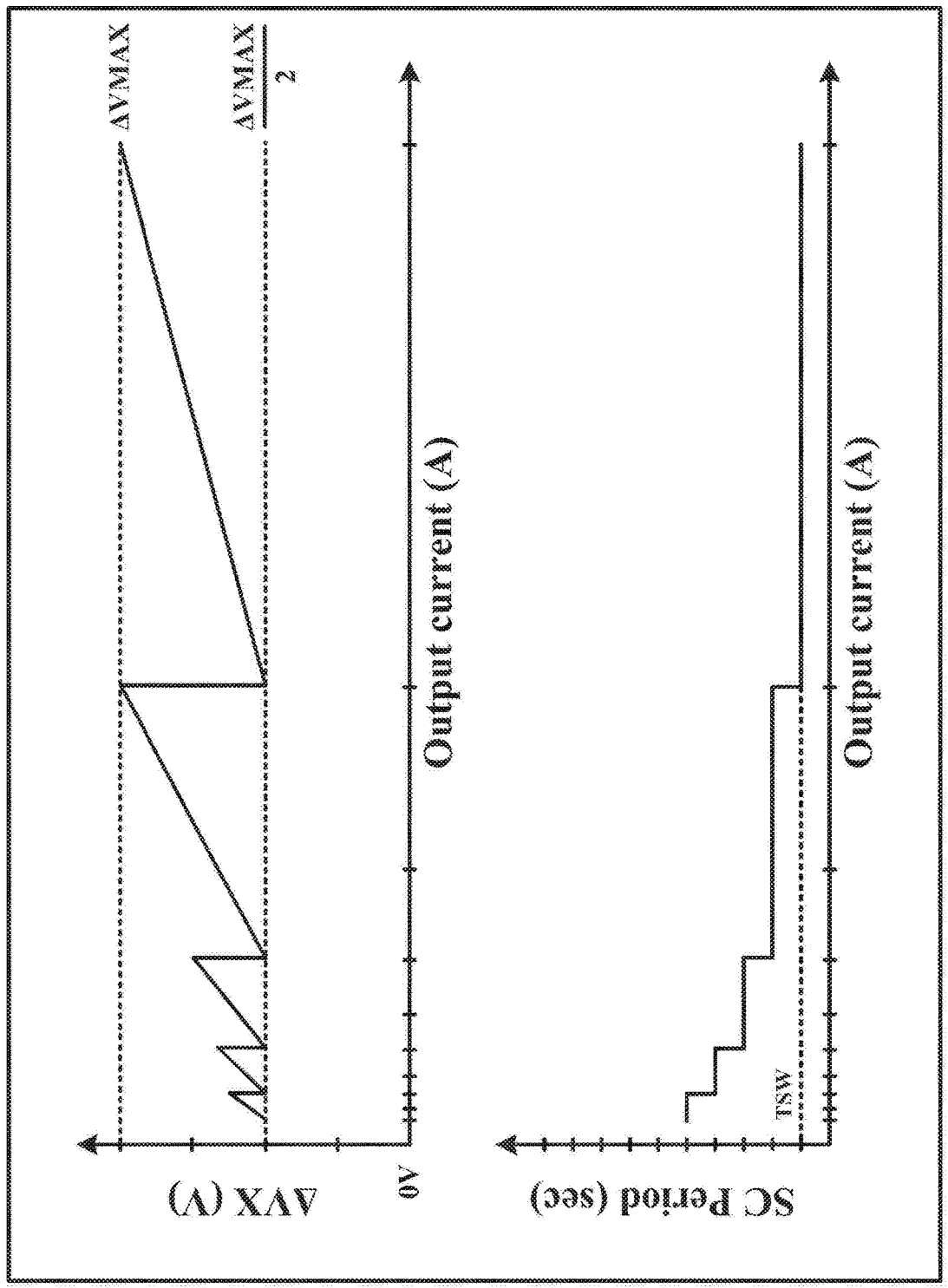
FIGS. 8A-8B show the relationship between the load current and the intermediate voltage ripple.

FIG. 8A illustrates the period of the switched capacitor element 12A and the intermediate peak-peak voltage ripple ΔVX as a function of the output current. As the output current decreases, the slope of the voltage ripple on the intermediate voltage VX decreases. This reduces the frequency of the first and second phase voltages VA, VB. Due to synchronization, the reduction in frequency occurs abruptly and only at specific output current values. The change in frequency takes place whenever the intermediate peak-peak voltage ripple ΔVX is equal to a maximum peak-peak voltage ripple ΔVMAX divided by two. Consequently, the intermediate peak-peak voltage ripple ΔVX follows a saw-tooth waveform with a fixed valley voltage. Furthermore, as the output current approaches zero, the intermediate peak-peak voltage ripple ΔVX approaches one-half of the maximum peak-peak voltage ripple ΔVMAX.

Figure 8B:
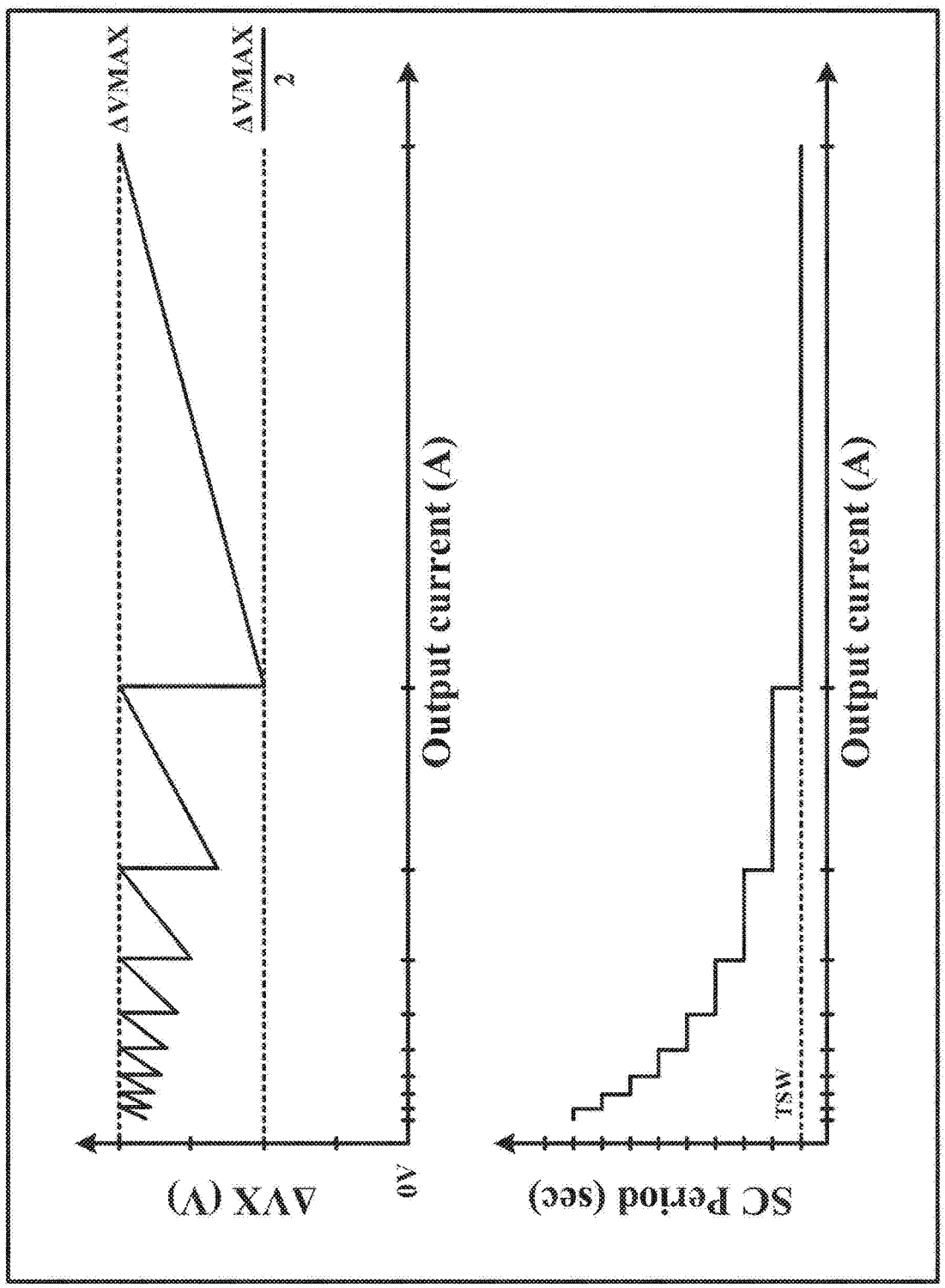

With a few modifications to the controller 20A, it is also possible to get the intermediate peak-peak voltage ripple ΔVX to follow a saw-tooth waveform with a fixed peak voltage as illustrated in FIG. 8B. In this scenario, as the output current approaches zero, the intermediate peak-peak voltage ripple ΔVX approaches the maximum peak-peak voltage ripple ΔVMAX. The main difference between the first approach in FIG. 8A and second approach in FIG. 8B is the distribution of frequencies and intermediate peak-peak voltage ripple ΔVX across the output current range.

The controller 20A depicted in FIG. 4 and described above is one of many possible implementations of the first generic controller 20 that can synchronize the power converter 10A or any power converter that includes a switched capacitor element 12A that precedes a regulating circuit 16A. In the modular multi-stage power converter architecture, the switched capacitor element 12A and the regulating circuit 16A can be mixed and matched in a variety of different ways. For example, FIG. 9 illustrates an alternative power converter 10B, wherein a regulating circuit 16A precedes a switched capacitor element 12A.

Figure 9:
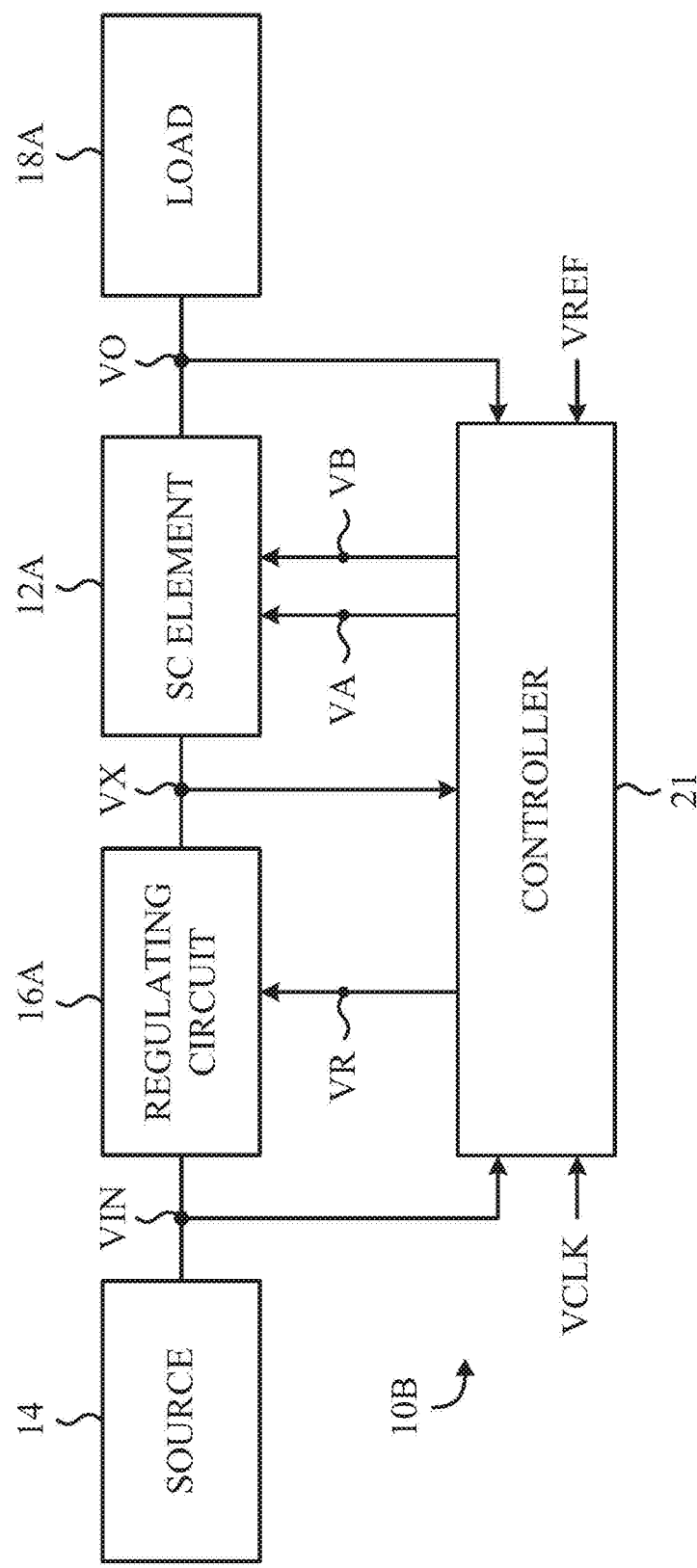
FIG. 9 shows a controller that synchronizes a regulating circuit that precedes a switched capacitor element.

In FIG. 9, a second generic controller 21 synchronizes the regulating circuit 16A and the switched capacitor element 12A. The input and output signals of the second generic controller 21 are the same as that of the first generic controller 20. In the power converter 10B, the regulating circuit 16A may include various types of switch-mode power converters, such as a boost converter, a resonant converter, and a fly-back converter. Similarly, the switched capacitor element 12A may include various types of switched capacitor converters, such as a series-parallel charge pump, a voltage doubler, and a cascade multiplier. Regardless of the selection of either the regulating circuit 16A or the switched capacitor element 12A, if the two stages are synchronized, the frequency of the switched capacitor element 12A will change in discrete steps as the output current of the power converter 10B is varied.

Figure 10:
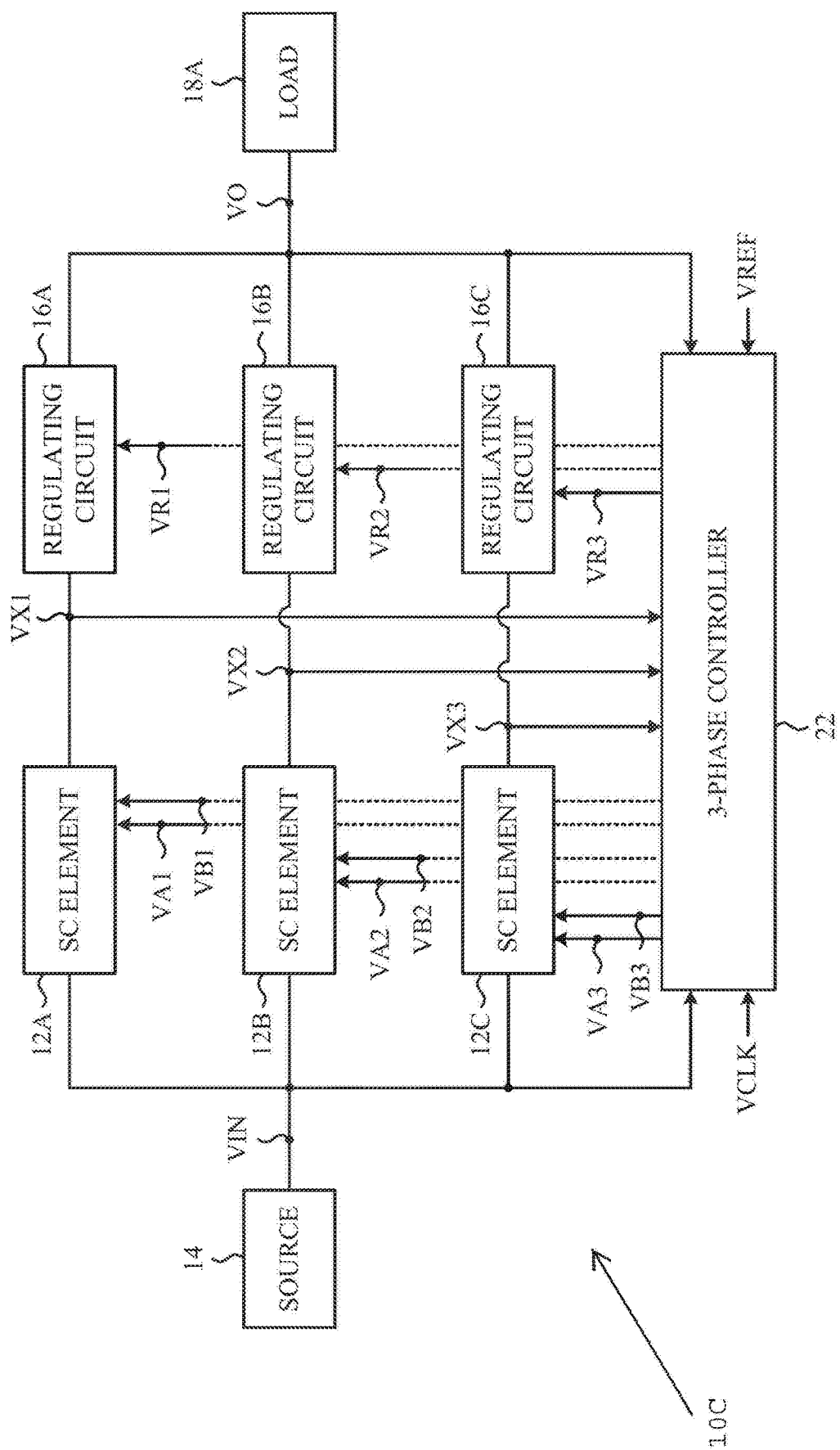
FIG. 10 shows a three-phase controller that synchronizes a three-phase switched capacitor element that precedes a three-phase regulating circuit.

In addition to alternative modular multi-stage power converter architectures, it is also possible to synchronize multi-phase implementations. FIG. 10 illustrates a three-phase power converter 10C and a generic three phase-controller 22 that synchronizes the various stages. The three-phase power converter 10C includes three regulating sub-elements: a first regulating circuit 16A, a second regulating circuit 16B, a third regulating circuit 16C and three voltage transformation sub-elements: a first switched capacitor element 12A, a second switched capacitor element 12B, and a third switched capacitor element 12C. The first, second, and third switched capacitor elements 12A, 12B, 12C provide first, second, and third intermediate voltages VX1, VX2, VX3, respectively.

First, second, and third regulation control voltages VR1, VR2, VR3 control the first, second, and third regulating circuits 16A, 16B, 16C, respectively. Furthermore, first and second phase voltages VA1, VB1 control the first switched capacitor element 12A; third and fourth phase voltages VA2, VB2 control the second switched capacitor element 12B; and fifth and sixth phase voltages VA3, VB3 control the third switched capacitor element 12C. Additionally, a regulation control bus BVR includes the first, second, and third regulation control voltages VR1, VR2, VR3. A first phase bus BVA includes the first, third, and fifth phase voltages VA1, VA2, VA3. Lastly, a second phase bus BVB includes the second, fourth, and sixth phase voltages VB1, VB2, VB3.

Figure 11:
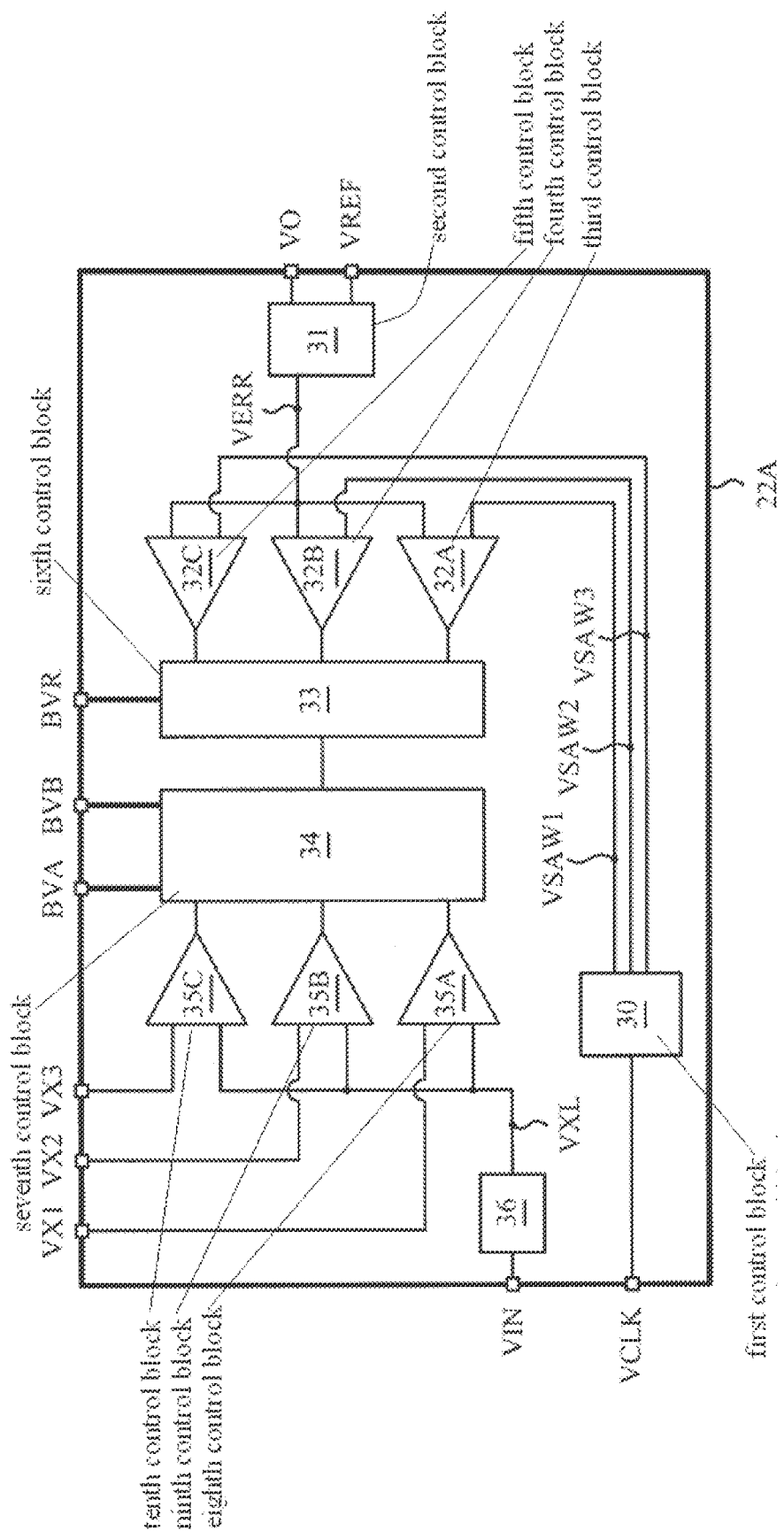
FIG. 11 shows a particular implementation of the three-phase controller in FIG. 10.

FIG. 11 illustrates a three-phase controller 22A that is a preferred embodiment of the generic three-phase controller 22. The three-phase controller 22A can be separated into a first control section and a second control section. The control circuitry for the first, second, and third regulating circuits 16A, 16B, 16C is in the first control section and includes first, second, third, fourth, fifth, and sixth control blocks 30, 31, 32A, 32B, 32C, 33. In contrast, the control circuitry for the first, second, and third switched capacitor elements 12A, 12B, 12C is in the second control section and includes seventh, eighth, ninth, tenth, and eleventh control blocks 34, 35A, 35B, 35C, 36.

The three-phase controller 22A looks very similar to the controller 20A in FIG. 4, but with additional input and output signals. In the three-phase controller 22A, a linear voltage-mode control scheme is used to control the regulating circuits 16A-16C and a hysteretic control scheme is used to control the switched capacitor elements 12A-12C. Consequently, the operation of the first and second control sections in the three-phase controller 22A is similar to that described in connection with FIG. 4.

In the first control section, the first control block 30 sets the frequency and phase of the first, second, and third regulation control voltages VR1, VR2, VR3. The first control block 30 generates first, second, and third saw-tooth voltages VSAW1, VSAW2, VSAW3 that are compared to an error voltage VERR by the third, fourth, and fifth control blocks 32A, 32B, 32C, respectively. The resulting three outputs are further conditioned by the sixth control block 33 that produces the regulation control bus BVR.

In the second control section, the first, second, and third intermediate voltages VX1, VX2, VX3 are compared to a trigger voltage VXL produced by the eleventh control block 36. The output of the eighth, ninth, tenth control blocks 35A, 35B, 35C are further conditioned by the seventh control block 34 resulting in the first and second phase buses BVA, BVB. The 'link' between the sixth control block 33 and the seventh control block 34 enables synchronization of the first and second control sections.

Figure 12A:
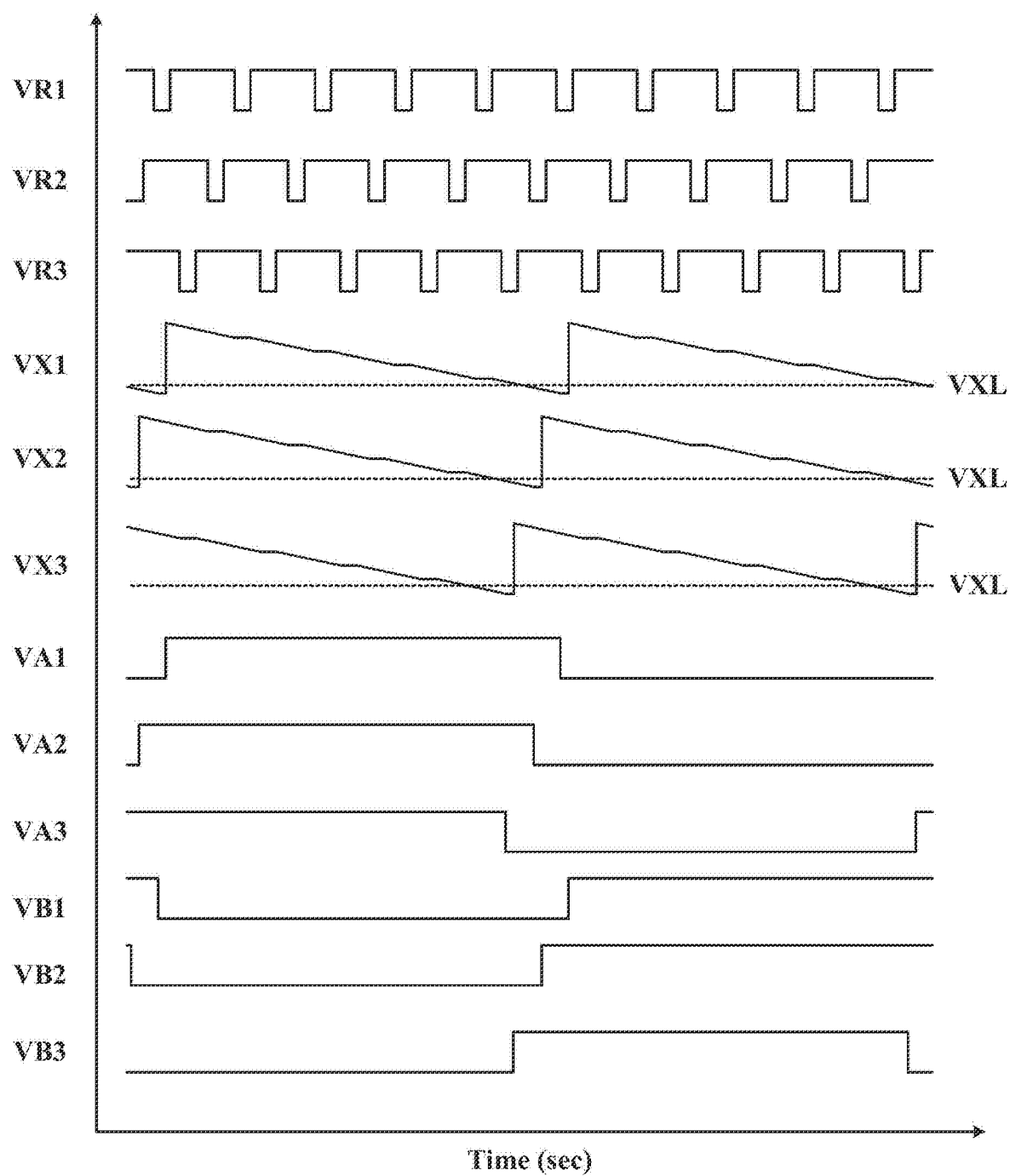
FIGS. 12A-12B show timing diagrams of relevant signals from the embodiment in FIG. 11.

In an effort to promote clarity, FIG. 12A illustrates some relevant signals generated by the three-phase controller 22A. The first, second, and third regulation control voltages VR1, VR2, VR3 are one hundred and twenty degrees out of phase with each other. Meanwhile, the phase voltages VA1, VA2, VA3 are shifted in time with respect to each other the same amount as their corresponding regulation control voltages VR1, VR2, VR3 are shifted in time with respect to each other. Furthermore, the second, fourth, and sixth phase voltages VB1, VB2, VB3 are one hundred and eighty degrees out of phase with the first, third, and fifth phase voltages VA1, VA2, VA3, respectively.

For example, if the frequency of the first, second, and third regulating circuits 16A, 16B, 16C is one megahertz, then the rising and/or falling edges of the first, second, and third regulation control voltages VR1, VR2, VR3 are separated by one-third of a microsecond. Consequently, the rising and/or falling edges of the first, third, and fifth phase voltages VA1, VA2, VA3 are separated by one-third of a microsecond and the rising and/or falling edges of the second, fourth, and sixth phase voltages VB1, VB2, VB3 are separated by one-third of a microsecond.

Figure 12B:
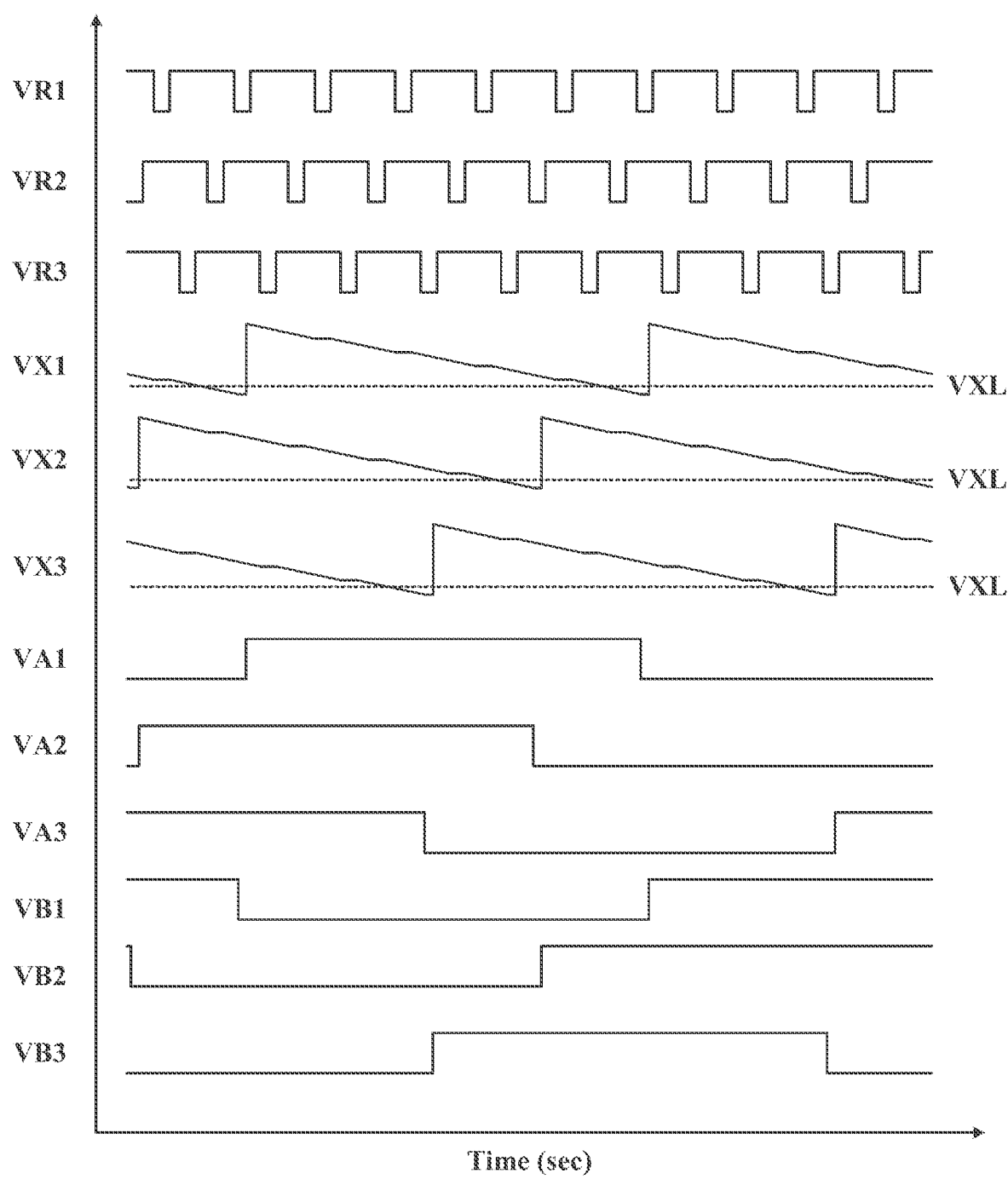

With a few modifications to the three-phase controller 22A, it is possible to further shift the first, third, and fifth phase voltages VA1, VA2, VA3 by one or more whole periods of the regulating circuits 16A-16C as illustrated in FIG. 12B.

For example, if the frequency of each of the regulating circuits 16A-16C is one megahertz, then the period of each of the regulating circuits 16A-16C is one microsecond. Assuming a shift of one period, then the rising and/or falling edges of the first, third, and fifth phase voltages VA1, VA2, VA3 are separated by one and one-third of a microsecond and the rising and/or falling edges of the second, fourth, and sixth phase voltages VB1, VB2, VB3 are separated by one and one-third of a microsecond. Among other benefits, the more uniform spacing of the first intermediate voltage VX1 ripple, the second intermediate voltage VX2 ripple, and the third intermediate voltage VX3 ripple reduces their effect on the output voltage VO.

As in the single-phase case, the glitch capacitor CX can be removed altogether if the dead-time interval DT of each of the switched capacitor elements 12A, 12B, 12C occurs when their corresponding regulating circuits 16A, 16B, 16C are neither sinking nor sourcing current through an inductive element. For example, in a buck converter, the filter inductor is sinking current from the input only a portion of the time, whereas, in a boost converter, the filter inductor is sourcing current to the output only a portion of the time. These power converters have a discontinuous current interval during which current is either sunk or sourced. Therefore, the glitch capacitor CX is unnecessary if the dead-time interval DT of each of the switched capacitor elements 12A, 12B, 12C occurs during the discontinuous input current interval.

Both the controller 20A in FIG. 4 and the three-phase controller 22A in FIG. 11 utilize linear voltage-mode control. However, other control techniques such as non-linear voltage-mode control, peak current-mode control, and average current-mode control are applicable as well.

The control circuitry described herein synchronizes the switched capacitor elements 12A with the regulating circuits 16A in the modular multi-stage power converter architecture. Among other advantages, the control circuitry described herein provides a way to minimize the effect of the intermediate voltage VX ripple on the output voltage VO and minimize the production of a voltage 'glitch' during the dead-time internal DT of the switched capacitor element 12A.

Various features, aspects, and embodiments of control techniques for power converters that utilize capacitors to transfer energy have been described herein. The features, aspects, and numerous embodiments described are susceptible to combination with one another as well as to variation and modification, as will be understood by those having ordinary skill in the art. The present disclosure should, therefore, be considered to encompass such combinations, variations, and modifications. Additionally, the terms and expression which have been employed herein are used as terms to description and not of limitation, and there is no intention, in the use of such terms and expression, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

Having described the invention, and a preferred embodiment thereof, what is claimed as new and secured by letters patent is:

What is claimed is:

1. A power converter, comprising:
    a voltage converting circuit configured to provide an output voltage regulated based on a first signal; and
    a switched capacitor circuit coupled to the voltage converting circuit, wherein the switched capacitor circuit is a multiple phase circuit comprising a first switched capacitor element and a second switched capacitor element each configured to change between a first network state and a second network state and each configured to provide, to an output node, an output voltage of the switched capacitor circuit in both the first network state and the second network state,
    wherein the first switched capacitor element comprises a first capacitor, a first set of switches configured to be switched substantially in accordance with a switching frequency and based on a first phase voltage, and a second set of switches configured to be switched substantially in accordance with the switching frequency and based on a second phase voltage out of phase with the first phase voltage,
    wherein the second switched capacitor element comprises a second capacitor, a third set of switches configured to be switched substantially in accordance with the switching frequency and based on the second phase voltage, and a fourth set of switches configured to be switched substantially in accordance with the switching frequency and based on the first phase voltage out of phase with the second phase voltage; and
    a controller coupled to the voltage converting circuit and the switched capacitor circuit, wherein the controller is configured to provide one or more control signals to the voltage converting circuit and to the switched capacitor circuit and configured to coordinate operation of the voltage converting circuit and the switched capacitor circuit based on the one or more control signals such that the first switched capacitor element operates simultaneously and in an out of phase relationship with the second switched capacitor element.

2. The power converter of claim 1, wherein the first switched capacitor element and the second switched capacitor element are configured to operate simultaneously and in the out of phase relationship such that:
    in the first network state, each switch of the first and fourth sets of switches is in a closed state based on the first phase voltage and each switch of the second and third sets is in an open state based on the second phase voltage; and
    in the second network state, each switch of the first and fourth sets of switches is in the open state based on the first phase voltage and each switch of the second and third sets is in the closed state based on the second phase voltage.

3. The power converter of claim 1, wherein each switch of the first, second, third, and fourth set of switches is configured to be in an open state or a closed state, wherein, in both the first network state and the second network state, each switch of the first set of switches is in an opposite state relative to its corresponding switch of the third set of switches and each switch of the second set of switches is in an opposite state relative to its corresponding switch of the fourth set of switches.

4. The power converter of claim 1, wherein:
    in the first network state:
        the first capacitor of the first switched capacitor element is configured to charge; and
        the second capacitor of the second switched capacitor element is configured to discharge to the output node; and
    in the second network state:
        the first capacitor of the first switched capacitor element is configured to discharge to the output node; and
        the second capacitor of the second switched capacitor element is configured to charge.

5. The power converter of claim 1, wherein the controller is configured to compare the output voltage of the voltage converting circuit with a trigger voltage to trigger an initiation of a dead-time interval, wherein the controller is configured to coordinate the operation of the switched capacitor circuit and the voltage converting circuit by setting a period of the switched capacitor circuit at least in part based on a period of the voltage converting circuit, wherein the controller is configured to coordinate the operation of the voltage converting circuit and the switched capacitor circuit such that the voltage converting circuit and the switched capacitor circuit are synchronized based, at least in part, on the dead-time interval, and wherein the trigger voltage is adjustable on the fly.

6. The power converter of claim 1, wherein the first switched capacitor element and the second switched capacitor element are coupled to a voltage source.

7. The power converter of claim 1, wherein the controller is configured to generate the first signal and the one or more control signals in response to one or more voltage signals associated with the switched capacitor circuit and the voltage converting circuit, and wherein the one or more voltage signals comprise a reference voltage, an output voltage, an intermediate voltage, an input voltage, or any combination thereof.

8. The power converter of claim 1, wherein the power converter is configured to provide power to a load, and wherein the controller is configured to coordinate the operation of the switched capacitor circuit and the voltage converting circuit to facilitate power consumption by the load.

9. The power converter of claim 1, wherein each switch of the first and second sets of switches of the first switched capacitor element is configured to be in an open state during a dead-time interval of the first switched capacitor element between the first network state and the second network state of the first switched capacitor element.

10. A power converter, comprising:
a regulating circuit configured to receive an input voltage and configured to provide, in response to the input voltage, a regulating circuit output voltage regulated based on a first signal; and
a switched capacitor circuit coupled to the regulating circuit, the switched capacitor circuit being a multiple phase circuit having multiple paths associated with corresponding voltages out of phase with each other, the switched capacitor circuit comprising at least a first capacitor and a second capacitor and a plurality of switches configured to be switched substantially in accordance with a switching frequency to change between a first network state and a second network state to alternatively charge or discharge the first and second capacitors simultaneously and in an out of phase relationship with each other and such that an output voltage is provided to an output node of the switched capacitor circuit in both the first network state and the second network state;
wherein the plurality of switches is configured to be controlled by a controller such that:
the switching frequency varies in response to an output current of the power converter,
the switching frequency is switched from a first frequency to a second frequency greater than the first frequency when the output current reaches a first threshold, and
the switching frequency is switched from the second frequency to a third frequency greater than the second frequency when the output current reaches a second threshold greater than the first threshold.

11. The power converter of claim 10, wherein the plurality of switches comprises:
a first set of switches associated with the first capacitor and configured to be switched based on a first phase voltage;
a second set of switches associated with the first capacitor and configured to be switched based on a second phase voltage out of phase with the first phase voltage;
a third set of switches associated with the second capacitor and configured to be switched based on the second phase voltage; and
a fourth set of switches associated with the second capacitor and configured to be switched based on the first phase voltage.

12. The power converter of claim 11, wherein the plurality of switches are configured to be switched substantially in accordance with the switching frequency to:
in the first network state, simultaneously charge the first capacitor and discharge the second capacitor; and
in the second network state, simultaneously discharge the first capacitor and charge the second capacitor.

13. The power converter of claim 11, wherein one switch of the first set of switches and one switch of the third set of switches are coupled to a voltage source.

14. The power converter of claim 10, wherein the power converter is configured to be controlled by the controller such that operation of the regulating circuit and the switched capacitor circuit are coordinated.

15. The power converter of claim 10, wherein the plurality of switches is configured to be controlled by the controller such that the switching frequency changes in discrete steps as the output current of the power converter is varied.

16. The power converter of claim 10, further comprising:
the controller coupled to the regulating circuit and the switched capacitor circuit, wherein the controller is configured to generate the first signal and configured to generate one or more second signals to adjust the switching frequency.

17. The power converter of claim 16, wherein the controller is configured to provide one or more control signals to the regulating circuit and to the switched capacitor circuit and configured to coordinate operation of the regulating circuit and the switched capacitor circuit based on the one or more control signals.

18. The power converter of claim 16, wherein the controller is further configured to compare the regulating circuit output voltage with a trigger voltage to trigger an initiation of a dead-time interval, wherein the plurality of switches are configured to be switched based, at least in part, on the dead-time interval, and wherein the trigger voltage is adjustable on the fly.

19. The power converter of claim 10, wherein the power converter is configured to be controlled by the controller such that the first signal is generated in response to one or more voltage signals associated with the regulating circuit, and wherein the one or more voltage signals comprise a reference voltage, an output voltage, the regulating circuit output voltage, an input voltage, or any combination thereof.

20. The power converter of claim 10, wherein the power converter is configured to provide power to a load, and wherein the power converter is configured to be controlled by the controller such that operation of the switched capacitor circuit and the regulating circuit are coordinated, at least in part, to facilitate power consumption by the load.

21. The power converter of claim 10, wherein a first time period of the first network state and a second time period of the second network state in one cycle vary in response to the output current.

22. The power converter of claim 10, wherein the switches of the switched capacitor circuit comprising a plurality of first switches configured to be in a closed state in the first network state and a plurality of second switches configured to be in a closed state in the second network state, and wherein the first switches and the second switches are configured to be in an open state during a dead-time interval between the first network state and the second network state.

23. An integrated circuit of a switched capacitor circuit, the switched capacitor circuit being a multiple phase circuit having multiple paths associated with corresponding voltages out of phase with each other, the switched capacitor circuit having at least a first capacitor and a second capacitor and the switched capacitor circuit being coupled to a regulating circuit configured to provide, in response to an input voltage, a regulating circuit output voltage regulated based on a first signal, the integrated circuit comprising:
a plurality of switches configured to be switched substantially in accordance with a switching frequency to change between a first network state and a second network state to alternatively charge or discharge the first and second capacitors simultaneously and in an out of phase relationship with each other and such that an output voltage is provided to an output node of the switched capacitor circuit in both the first network state and the second network state, wherein the plurality of switches are configured to be coupled to the first capacitor and the second capacitor, wherein the plurality of switches is configured to be controlled by a controller such that:

the switching frequency varies in response to an output current of the integrated circuit;

the switching frequency is switched from a first frequency to a second frequency greater than the first frequency when the output current reaches a first threshold; and the switching frequency is switched from the second frequency to a third frequency greater than the second frequency when the output current reaches a second threshold greater than the first threshold.

24. The integrated circuit of claim 23, further comprising the controller, wherein the controller is configured to control the plurality of switches such that the switching frequency changes in discrete steps as the output current is varied.

25. The integrated circuit of claim 23, wherein the plurality of switches comprises a plurality of first switches configured to be closed in the first network state and a plurality of second switches configured to be closed in the second network state, and wherein the first switches and the second switches are configured to be open during a dead-time interval between the first network state and the second network state.

26. An apparatus comprising the integrated circuit of claim 23, further comprising the switched capacitor circuit and the controller, wherein the controller is configured to control the integrated circuit such that operation of the regulating circuit and the switched capacitor circuit are coordinated based on one or more control signals.

27. The apparatus of claim 26, wherein the controller is coupled to the regulating circuit and the switched capacitor circuit, and wherein the integrated circuit is configured to be controlled by the controller such that the first signal is generated by the controller and one or more second signals are generated by the controller to adjust the switching frequency.

28. The apparatus of claim 27, wherein the controller is configured to compare the regulating circuit output voltage with a trigger voltage to trigger an initiation of a dead-time interval, wherein the plurality of switches are configured to be switched based, at least in part, on the dead-time interval, and wherein the trigger voltage is adjustable on the fly.

29. The apparatus of claim 26, wherein the integrated circuit is configured to be controlled by the controller such that the first signal is generated in response to one or more voltage signals associated with the regulating circuit, and wherein the one or more voltage signals comprise a reference voltage, an output voltage, the regulating circuit output voltage, an input voltage, or any combination thereof.

30. An apparatus comprising the integrated circuit of claim 23, wherein the integrated circuit is configured to provide power to a load, and wherein the integrated circuit is configured to be controlled by the controller such that operation of the switched capacitor circuit and the regulating circuit are coordinated, at least in part, to facilitate power consumption by the load.

* * * * *

UNITED STATES PATENT AND TRADEMARK OFFICE
CERTIFICATE OF CORRECTION

PATENT NO. : 12,176,815 B2
APPLICATION NO. : 18/743046
DATED : December 24, 2024
INVENTOR(S) : David Giuliano Page 1 of 1

It is certified that error appears in the above-identified patent and that said Letters Patent is hereby corrected as shown below:

In the Specification

In the CROSS REFERENCE TO RELATED APPLICATIONS

Column 1, Lines 6-7, change "U.S. patent application Ser. No." to --U.S. Patent Application No.--.

Column 1, Line 8, change "U.S. patent application Ser. No." to --U.S. Patent Application No.--.

Column 1, Line 10, change "U.S. patent application Ser. No." to --U.S. Patent Application No.--.

Column 1, Line 13, change "U.S. patent application Ser. No." to --U.S. Patent Application No.--.

Column 1, Line 15, change "U.S. patent application Ser. No." to --U.S. Patent Application No.--.

In the DETAILED DESCRIPTION

Column 7, Line 17, change "voltage AVD below the trigger voltage" to --voltage $\Delta$VD below the trigger voltage--.

Column 7, Line 19, change "delta voltage AVD is small" to --delta voltage $\Delta$VD is small--.

Column 7, Lines 21-22, change "The delta voltage AVD at most can be equal to" to --The delta voltage $\Delta$VD at most can be equal to--.

Column 7, Line 23, change "peak-peak voltage ripple AVX" to --peak-peak voltage ripple $\Delta$VX--.

Signed and Sealed this
Eleventh Day of February, 2025

Coke Morgan Stewart
*Acting Director of the United States Patent and Trademark Office*